(12) United States Patent
Toizumi

(10) Patent No.: US 12,136,143 B2
(45) Date of Patent: *Nov. 5, 2024

(54) IMAGE PROCESSING SYSTEM CONFIGURED TO GENERATE A COLORIZED IMAGE

(71) Applicant: NEC Corporation, Tokyo (JP)

(72) Inventor: Takahiro Toizumi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 19 days.

This patent is subject to a terminal disclaimer.

(21) Appl. No.: 17/795,687

(22) PCT Filed: Feb. 13, 2020

(86) PCT No.: PCT/JP2020/005565
§ 371 (c)(1),
(2) Date: Jul. 27, 2022

(87) PCT Pub. No.: WO2021/161454
PCT Pub. Date: Aug. 19, 2021

(65) Prior Publication Data
US 2023/0059499 A1 Feb. 23, 2023

(51) Int. Cl.
*G06T 7/90* (2017.01)
*G06N 20/00* (2019.01)
*G06T 11/00* (2006.01)

(52) U.S. Cl.
CPC .......... *G06T 11/001* (2013.01); *G06N 20/00* (2019.01); *G06T 7/90* (2017.01); *G06T 2200/24* (2013.01);
(Continued)

(58) Field of Classification Search
None
See application file for complete search history.

(56) References Cited

U.S. PATENT DOCUMENTS 6,493,029 B1 * 12/2002 Denyer .................. G06T 3/403
348/253
11,158,286 B2 * 10/2021 Yaacob .................... G09G 5/06
(Continued)

FOREIGN PATENT DOCUMENTS

JP   H04-248684 A   9/1992
JP   2015-125498 A  7/2015
(Continued)

OTHER PUBLICATIONS

International Search Report for PCT Application No. PCT/JP2020/005565, mailed on Apr. 7, 2020,.
(Continued)

*Primary Examiner* — Joni Hsu
(74) *Attorney, Agent, or Firm* — Sughrue Mion, PLLC

(57) ABSTRACT

An image processing system according to an example aspect of the present disclosure includes: an image acquisition unit configured to acquire a monochrome image; a pixel value correction unit configured to correct a pixel value of the monochrome image based on information related to a pixel value; and a colorization generation unit configured to generate a colorized image corresponding to the monochrome image from the corrected monochrome image by using a colorization prediction model trained by machine learning. With the present disclosure, it is possible to improve the reproduction accuracy of a color in colorization of a monochrome image.

7 Claims, 27 Drawing Sheets

(52) U.S. Cl.
CPC ............... *G06T 2207/10024* (2013.01); *G06T 2207/20081* (2013.01)

(56) References Cited

U.S. PATENT DOCUMENTS

| | | |
|---|---|---|
| 2006/0245645 A1 | 11/2006 | Yatziv et al. |
| 2008/0037828 A1 | 2/2008 | Fujita |
| 2013/0070319 A1 | 3/2013 | Yamada et al. |
| 2014/0132429 A1* | 5/2014 | Scoville ............... H03M 7/3079 341/87 |
| 2017/0070645 A1* | 3/2017 | Ishitoya .................. H04N 1/62 |
| 2017/0323460 A1 | 11/2017 | Carney et al. |
| 2019/0297226 A1 | 9/2019 | Ohkubo et al. |
| 2020/0167972 A1* | 5/2020 | Birnhack ............... G06N 3/045 |

FOREIGN PATENT DOCUMENTS

| | | |
|---|---|---|
| JP | 2019-117558 A | 7/2019 |
| JP | 2019-128889 A | 8/2019 |
| JP | 2019-140538 A | 8/2019 |
| JP | 2019-145030 A | 8/2019 |
| JP | 2019-153917 A | 9/2019 |

OTHER PUBLICATIONS

Richard Zhang, Jun-Yan Zhu et al., "Real-Time User-Guided Image Colorization with Learned Deep Priors", ACM Transactions on Graphics, May 8. 2017.
US Office Action for U.S. Appl. No. 17/795,678, mailed on Nov. 16, 2023.
International Search Report of PCT Application No. PCT/JP2020/005562 mailed Mar. 31, 2020.

* cited by examiner

| CATEGORY | SECOND COLOR HINT | | |
|---|---|---|---|
| | L | a | b |
| SKIN | L21 | a21 | b21 |
| | ... | ... | ... |
| | ... | ... | ... |
| SKY | L22 | a22 | b22 |
| | ... | ... | ... |
| ... | ... | ... | ... |

Fig. 16A

| CATEGORY | FIRST COLOR HINT | SECOND COLOR HINT | | |
|---|---|---|---|---|
| | | L | a | b |
| SKIN | L11~L12, a11~a12, b11~b12 | L21 | a21 | b21 |
| | L12~L13, a12~a13, b12~b13 | L22 | a22 | b22 |
| | ... | ... | ... | ... |
| SKY | ... | L23 | a23 | b23 |
| | ... | L24 | a24 | b24 |
| | ... | ... | ... | ... |
| ... | ... | ... | ... | ... |

Fig. 17A

| CATEGORY | CONVERSION PARAMETER | | |
|---|---|---|---|
| SKIN | P11 | P12 | ... |
| SKY | ... | ... | ... |
| ... | ... | ... | ... |

Fig. 18A ized IMAGE PROCESSING SYSTEM
CONFIGURED TO GENERATE A
COLORIZED IMAGE

This application is a National Stage Entry of PCT/JP2020/005565 filed on Feb. 13, 2020, the contents of all of which are incorporated herein by reference, in their entirety.

TECHNICAL FIELD

The present disclosure relates to an image processing system, an image processing method, and a non-transitory computer readable medium that colorize a monochrome image.

BACKGROUND ART

An image processing system that colorizes a monochrome image has been known. For example, Patent Literature 1 discloses image processing system which converts a monochrome image into a colorized image using a trained prediction model based on colors (color hints) designated by a user using a general-purpose color palette.

CITATION LIST

Non Patent Literature

Non Patent Literature 1: Richard Zhang, Jun-Yan Zhu, "Real-Time User-Guided Image Colorization with Learned Deep Priors.", ACM Transactions on Graphics, submitted on May 8, 2017

SUMMARY OF INVENTION

Technical Problem

However, the monochrome image to be colorized may have pixel values different from the actual values due to gradation deterioration or illumination at the time of photographing. In the image processing system described above, since a colorized image is generated based on the pixel values of a monochrome photograph to be input to a prediction model, there is a problem that it is difficult to reproduce colors correctly when the above monochrome photograph is colorized.

Solution to Problem

The present disclosure has been made in view of the above-described problem.

An image processing system according to an example aspect of the present disclosure includes: an image acquisition unit configured to acquire a monochrome image; a pixel value correction unit configured to correct a pixel value of the monochrome image based on information related to a pixel value; and a colorization generation unit configured to generate a colorized image corresponding to the monochrome image from the corrected monochrome image by using a colorization prediction model trained by machine learning.

An image processing method according to another example aspect of the present disclosure includes: acquiring a monochrome image; correcting a pixel value of the monochrome image based on information related to a pixel value; and generating a colorized image corresponding to the monochrome image from the corrected monochrome image by using a colorization prediction model trained by machine learning.

A non-transitory computer readable medium according to another example aspect of the present disclosure stores an image processing program for causing a computer to implement: an image acquisition function of acquiring a monochrome image; a pixel value correction function of correcting a pixel value of the monochrome image based on information related to a pixel value; and a colorization generation function of generating a colorized image corresponding to the monochrome image from the corrected monochrome image by using a colorization prediction model trained by machine learning.

BRIEF DESCRIPTION OF DRAWINGS

FIG. 16A is a diagram showing an example of a data structure of a first conversion table according to the fourth example embodiment;
FIG. 17A is a diagram showing an example of a data structure of a second conversion table according to the fourth example embodiment;

FIG. 18A is a diagram showing an example of a data structure of a third conversion table according to the fourth example embodiment;

EXAMPLE EMBODIMENT

Specific example embodiments will be described hereinafter in detail with reference to the drawings. The same or corresponding elements are denoted by the same reference symbols throughout the drawings, and redundant descriptions will be omitted as necessary for the clarification of the description. Note that, in the present specification, colors are specifically defined using a CIE L*a*b* color space standardized by the International Commission on Illumination (CIE) in 1976. However, the colors are not limited to being defined using the CIE L*a*b* color space, and they may instead be defined using any other color space such as RGB, HSV, and YCrCb. Hereinafter, L*, a*, and b* are simply referred to as L, a, and b, respectively.

Figure 1:
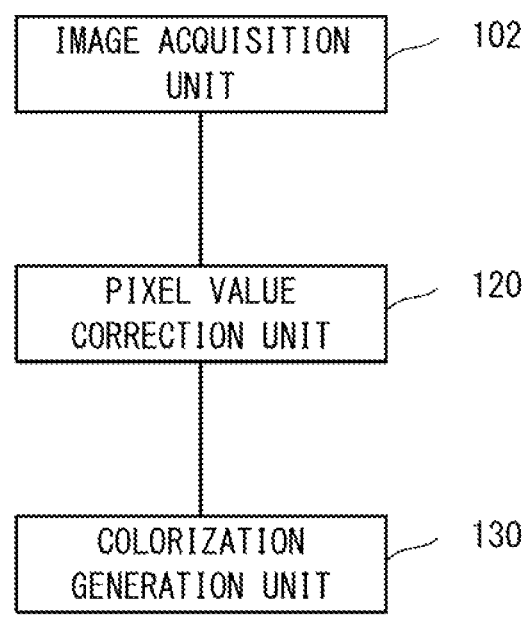
FIG. 1 is a block diagram showing a configuration of an apparatus according to an outline of example embodiments.

Prior to describing example embodiments in detail, an outline thereof will be briefly described first. FIG. 1 is a block diagram showing a configuration of an image processing system (simply referred to as an apparatus 10 in this example) according to an outline of the example embodiments. The apparatus 10 includes an image acquisition unit 102, a pixel value correction unit 120, and a colorization generation unit 130.

The image acquisition unit 102 acquires a monochrome image.

The pixel value correction unit 120 corrects a pixel value of the monochrome image based on information related to the pixel value.

The colorization generation unit 130 generates a colorized image corresponding to the monochrome image from the corrected monochrome image by using a colorization prediction model trained by machine learning.

By the above configuration, it is possible to colorize a monochrome image in which the pixel values have been corrected. Thus, it is possible to improve the reproduction accuracy of a color in colorization of a monochrome image.

First Example Embodiment

Figure 2:
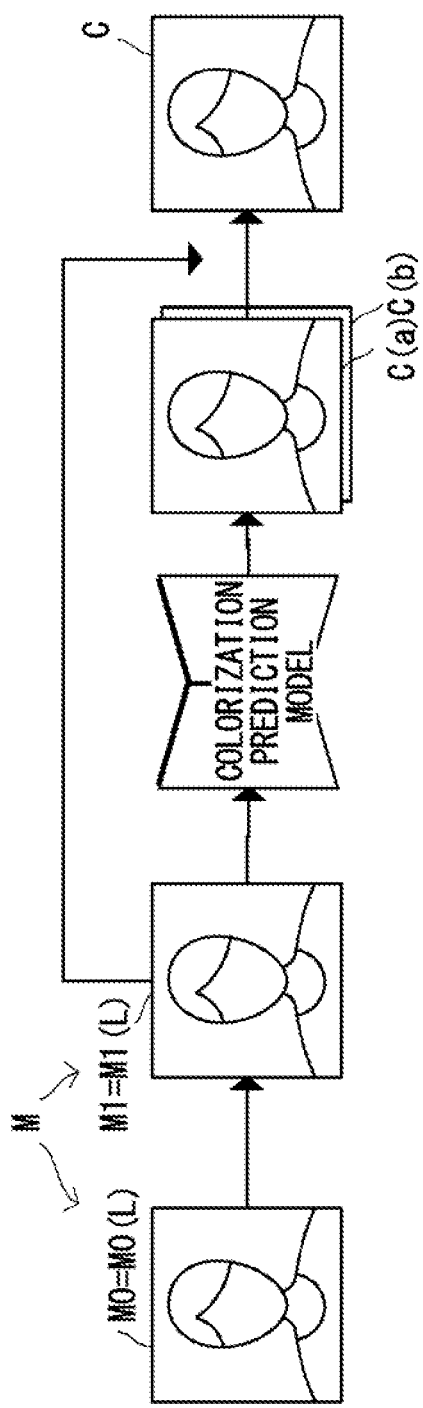
FIG. 2 is a diagram for explaining an outline of processes performed by an apparatus according to a first example embodiment.

Next, a first example embodiment of the present disclosure will be described with reference to FIGS. 2 to 5. FIG. 2 is a diagram for explaining an outline of processes performed by an apparatus 20 according to the first example embodiment. The apparatus 20 is a computer or the like which colors a monochrome image M by using a colorization prediction model based on the monochrome image M and thereby generates a colorized image C.

The monochrome image M is an image rendered using a background color and a single color other than the background color. The monochrome image M includes a number of pixels corresponding to "the number of pixels" thereof. Each pixel of the monochrome image M includes a pixel value indicating a gradation between the background color and the single color. The pixel value of the monochrome image M includes a value of any dimension of the color space. In the first example embodiment, the pixel value of the monochrome image M includes a luminance value of the monochrome image M, for example, a value of L.

The monochrome image M is a photographic image including one or a plurality of subjects. The subject is, for example, a person, a sky, a sunset, a tree, and grass. In the first example embodiment, the monochrome image M may be a grayscale image using white as the background color and black as the single color. However, the monochrome image M is not limited to being the aforementioned grayscale image, and the monochrome image M may instead be an image using a color other than black as the single color. Further, the monochrome image M may be a monochrome halftone image subjected to diffusing processing using a Gaussian filter, a median filter, or the like.

The colorized image C includes a number of pixels corresponding to "the number of pixels" thereof, which pixels correspond to those of the monochrome image M. Each one of the pixels of the colorized image C may include values for all dimensions of the color space. In the first example embodiment, each pixel of the colorized image C includes a value of a complementary color dimension in addition to the luminance value. The values of a complementary color dimension may be, for example, a value of a and a value of b.

The colorization prediction model is a prediction model trained by machine learning, which prediction model predicts the colors of the pixels of the monochrome image M. The colorization prediction model includes a neural network including, for example, an input layer, an intermediate layer, and an output layer. As an example, the neural network includes a convolutional neural network (CNN). Note that the neural network may include an autoencoder that compresses the dimension of the input layer, in particular, a conditional autoencoder. In the first example embodiment, although the colorization prediction model is a model trained by an end-to-end deep learning, it is not limited thereto.

In the first example embodiment, the colorization prediction model predicts values of a complementary color dimension (values of a and b) of the monochrome image M from a luminance value (value of L) included in a pixel value of the monochrome image M.

As shown in FIG. 2, in the first example embodiment, the apparatus 20 corrects the pixel value (the luminance value in this example) of a monochrome image M0 to be colorized and thereby generates a monochrome image M1. Then the apparatus 20 acquires prediction matrix diagrams C(a) and C(b) of the complementary color dimension of the colorized image C from the monochrome image M1, that is, a matrix diagram M1(L) of a luminance dimension of the monochrome image M1. Then the apparatus 20 composes the acquired C(a), C(b), and M(L) on each other and thereby generates the colorized image C.

In this way, the apparatus 20 can generate the colorized image C from the monochrome image M.

Figure 3:
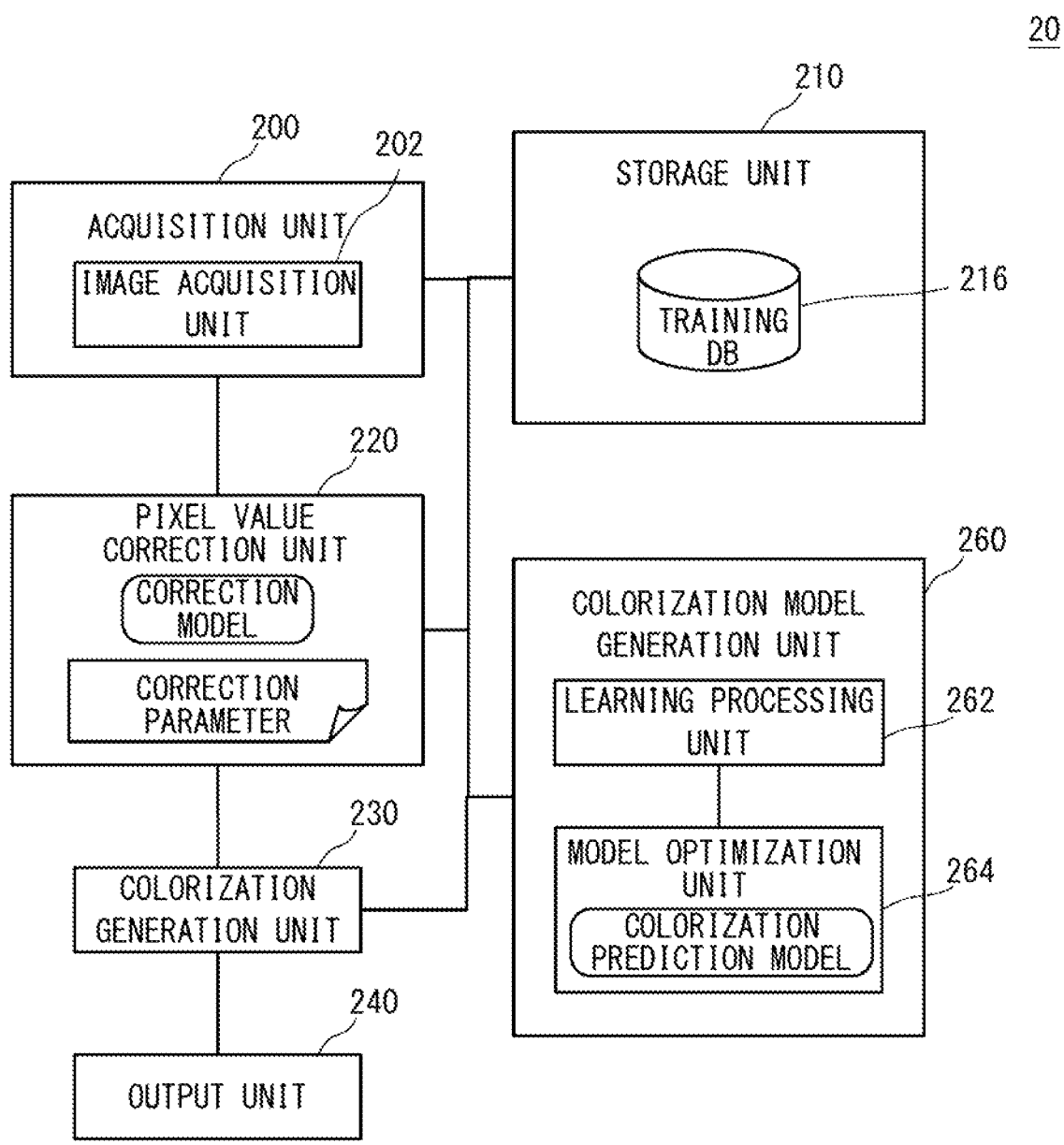
FIG. 3 is a schematic diagram of the apparatus according to the first example embodiment.

FIG. 3 is a schematic diagram of the apparatus 20 according to the first example embodiment. The apparatus 20 includes an acquisition unit 200, a storage unit 210, a pixel value correction unit 220, a colorization generation unit 230, an output unit 240, and a colorization model generation unit 260.

The acquisition unit 200 acquires various types of data related to input data of the colorization prediction model. The acquisition unit 200 outputs the acquired data to the pixel value correction unit 220. In addition to outputting the acquired data, the acquisition unit 200 may store the acquired data in the storage unit 210. Note that the acquisition unit 200 includes an image acquisition unit 202.

The image acquisition unit 202 acquires the monochrome image M (i.e., M0) to be colorized. The image acquisition unit 202 may acquire the monochrome image M and the colorized image C corresponding to the monochrome image M as training data.

The storage unit 210 is a storage medium for storing various types of data and the like related to a pixel value correction process and a colorization prediction model learning process. The storage unit 210 includes a training database 216.

The training database 216 stores training data and the like of the colorization prediction model.

The pixel value correction unit 220 corrects the pixel value of the monochrome image M0 based on information related to the pixel value. In the first example embodiment, the pixel value correction unit 220 corrects the pixel value of the monochrome image M0 by using a correction model based on the information related to the pixel value.

Note that the correction model may be a model having an algorithm for correcting the pixel values of the monochrome image M0 so that the distribution of the pixel values of the monochrome image M0 approaches a reference distribution of the pixel values of a reference image. In the first example embodiment, the information related to the pixel value includes parameters (correction parameters) of one or a plurality of correction models.

For example, the correction parameters may be parameters related to the reference distribution of the pixel values of the reference image. In the first example embodiment, although the correction parameters include an average and a standard deviation of the reference distribution of the pixel values of the reference image, it is not limited thereto. The correction parameters may instead include a minimum pixel value, a maximum pixel value, and the like of the reference distribution.

The colorization generation unit 230 generates the colorized image C corresponding to the monochrome image M from the monochrome image M (i.e., M1) in which the pixel values have been corrected by using the colorization prediction model. Note that the colorization generation unit 230 uses the colorization prediction model output from a model optimization unit 264 of the colorization model generation unit 260, which will be described later. Then the colorization generation unit 230 outputs the colorized image C to the output unit 240.

The output unit 240 outputs the colorized image C generated by the colorization generation unit 230 in a predetermined output format.

The colorization model generation unit 260 generates a colorization prediction model by machine learning using training data. The colorization model generation unit 260 includes a learning processing unit 262 and the model optimization unit 264.

The learning processing unit 262 manages training data of the colorization prediction model. The learning processing unit 262 acquires a data set including the monochrome image M and the colorized image C for training, that is, the training data, and stores it in the training database 216. Note that the training data stored in the training database 216 may be data which the learning processing unit 262 has acquired from the acquisition unit 200 or data which the learning processing unit 262 has received from another apparatus via any communication means (not shown). Further, the learning processing unit 262 outputs the training data stored in the training database 216 to the model optimization unit 264.

The model optimization unit 264 optimizes the colorization prediction model by machine learning using training data. The model optimization unit 264 outputs the optimized colorization prediction model to the colorization generation unit 230.

Figure 4:
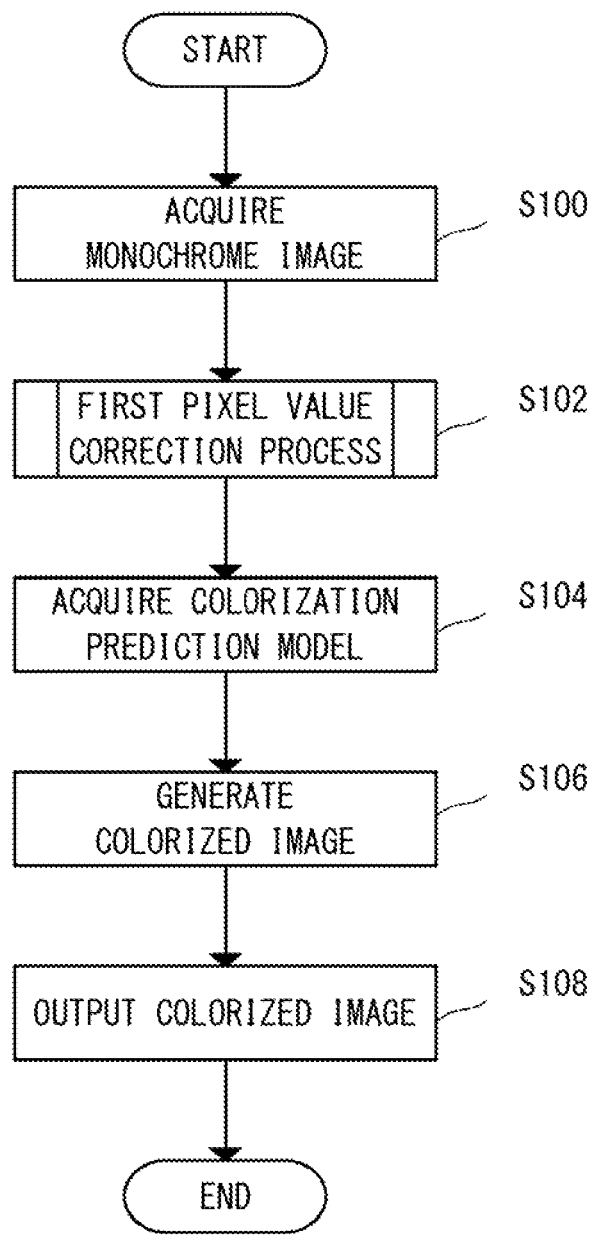
FIG. 4 is a flowchart showing image processing performed by the apparatus according to the first example embodiment.

Next, image processing performed by the apparatus 20 according to the first example embodiment will be described in detail. FIG. 4 is a flowchart showing image processing performed by the apparatus 20 according to the first example embodiment.

First, in S100, the image acquisition unit 202 of the acquisition unit 200 acquires the monochrome image M0 to be colorized. For example, the image acquisition unit 202 performs the above process when a user selects to input an image on a user interface (not shown) included in the apparatus 20 and transfers the predetermined monochrome image M0, which operation will be described later. Then the image acquisition unit 202 outputs the acquired monochrome image M0 to the pixel value correction unit 220.

Next, in S102, the pixel value correction unit 220 performs a first pixel value correction process on the output monochrome image M0 and thereby generates the monochrome image M1. In the first example embodiment, the pixel value correction unit 220 corrects the luminance value (the value of L) of the monochrome image M0 and thereby generates the monochrome image M1. Note that the details of the first pixel value correction process will be described later. The pixel value correction unit 220 outputs the monochrome image M1 to the colorization generation unit 230.

Next, in S104, the colorization generation unit 230 acquires the colorization prediction model from the model optimization unit 264.

Next, in S106, the colorization generation unit 230 uses the acquired monochrome image M1 as input data and generates the colorized image C corresponding to the monochrome image M1 by using the colorization prediction model. In the first example embodiment, the colorization generation unit 230 inputs the matrix diagram M1(L) of the luminance dimension of the monochrome image M1 into the colorization prediction model, and acquires the prediction matrix diagrams C(a) and C(b) of the complementary color dimension of the colorized image C. Then the colorization generation unit 230 composes the acquired C(a), C(b), and M (L) on each other and thereby generates the colorized image of the Lab color space. The colorization generation unit 230 converts the color space of the colorized image from the Lab color space to the RGB color space and thereby generates the colorized image C of the RGB color space. Then the colorization generation unit 230 outputs the colorized image C to the output unit 240.

In S108, the output unit 240 outputs the colorized image C. For example, the output unit 240 displays the colorized image C on the user interface. Further, the output unit 240 outputs the colorized image C in a predetermined data format when a user selects to output the image on the user interface. Then the output unit 240 ends the process.

As described above, according to the first example embodiment, the pixel value correction unit 220 corrects the pixel value of the monochrome image based on the correction parameter, and the colorization generation unit 230 generates the colorized image C from the corrected monochrome image M1. Therefore, it is possible to improve the reproduction accuracy of the color in colorization of the monochrome image.

Note that when the monochrome images M0 and M1 in the RGB color space are used, the pixel value correction unit 220 may, instead of performing S102 shown in FIG. 4, correct the pixel values of the R, G, and B dimensions of the monochrome image M0 and thereby generate the monochrome image M1. Then, instead of performing S106, the colorization generation unit 230 may input matrix diagrams of three dimensions of the pixel values of the monochrome image M1 in which the pixel values have been corrected into the colorization prediction model and acquire prediction matrix diagrams corresponding to the three dimensions. Then the apparatus 20 composes the acquired matrix diagrams of the three dimensions on each other and thereby generates the colorized image C of the RGB color space.

Figure 5:
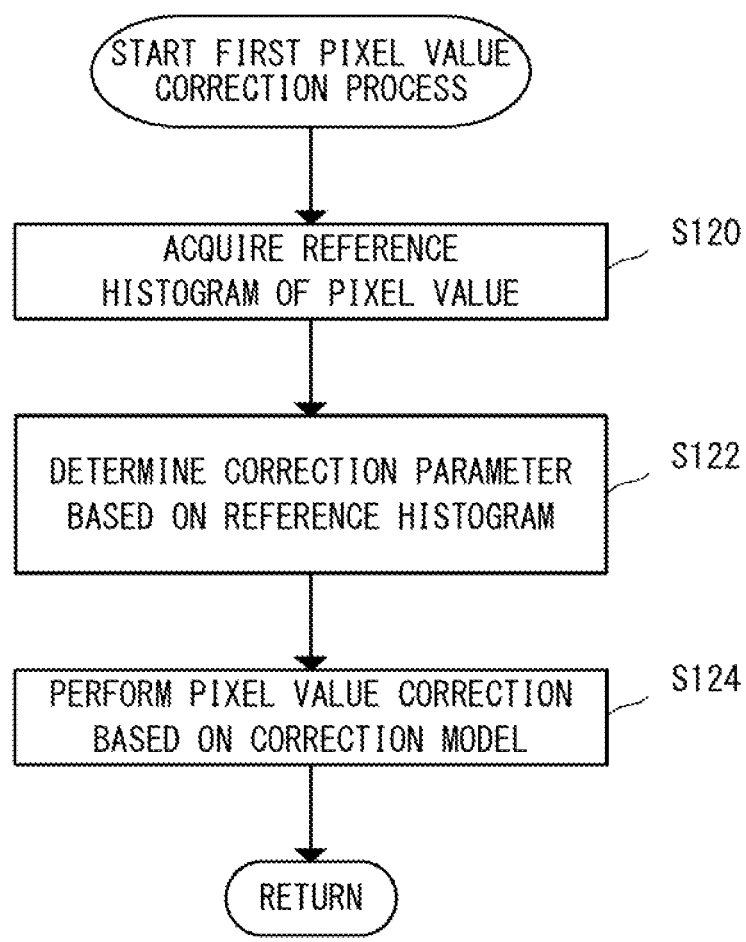
FIG. 5 is a flowchart showing a first pixel value correction process performed by a pixel value correction unit according to the first example embodiment.

FIG. 5 is a flowchart showing a first pixel value correction process performed by the pixel value correction unit 220 according to the first example embodiment.

First, in S120, the pixel value correction unit 220 acquires a reference histogram indicating a reference distribution of pixel values. In the first example embodiment, a histogram indicating distribution of pixel values is obtained for each of a plurality of reference images, and these plurality of histograms are averaged, and this averaged histogram may be used as the reference histogram. Note that the reference image may be any color image or any image obtained by converting any color image into a monochrome image.

Next, in S122, the pixel value correction unit 220 determines correction parameters of the correction model for correcting the pixel values of the monochrome image M0 based on the reference histogram. In the first example embodiment, the pixel value correction unit 220 determines that the average and the standard deviation of the reference histogram are correction parameters.

Next, in S124, the pixel value correction unit 220 performs pixel value correction of the pixels of the monochrome image M0 based on the correction model including the determined correction parameters. For example, the pixel value correction unit 220 corrects the pixel value of the monochrome image M0 so that an error between the average and the standard deviation of a pixel value histogram of the monochrome image M0 and the correction parameters is minimized. Note that the error may be a mean square error. In this way, the pixel value correction unit 220 can generate the monochrome image M1 in which the pixel value has been corrected so that the pixel value histogram approaches the reference histogram.

Note that, in the first example embodiment, although the training database 216 is included in the storage unit 210 of the apparatus 20, it may instead be included in another apparatus (not shown) or the like that is connected to the apparatus 20 so as to be able to communicate with the apparatus 20. At this time, the learning processing unit 262 may acquire training data from the other apparatus via any communication means (not shown) and output it to the model optimization unit 264.

Second Example Embodiment

Next, a second example embodiment of the present disclosure will be described with reference to FIGS. 6 to 8. The second example embodiment is characterized in that parameters (correction parameters) of a correction model used for pixel value correction are optimized by using a trained luminance prediction model. Note that, in the second example embodiment, the pixel value of the monochrome image M is a luminance value of the monochrome image M, and is, for example, a value of L.

Figure 6:
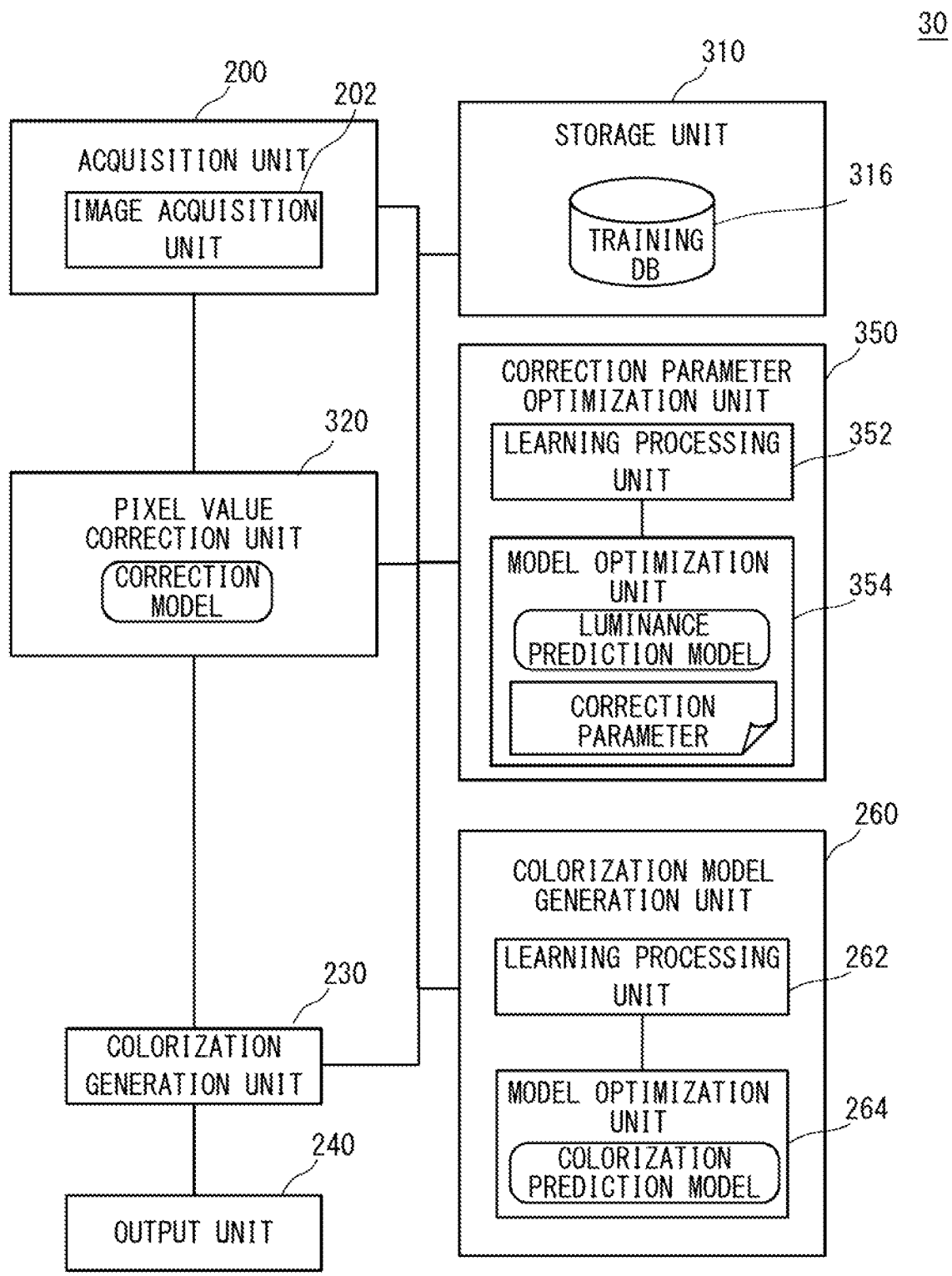
FIG. 6 is a schematic diagram of an apparatus according to a second example embodiment.

FIG. 6 is a schematic diagram of an apparatus 30 according to the second example embodiment. The configurations and the functions of the apparatus 30 are substantially similar to those of the apparatus 20 according to the first example embodiment. However, the apparatus 30 differs from the apparatus 20 in that the apparatus 30 includes a storage unit 310, a pixel value correction unit 320, and a correction parameter optimization unit 350 in place of the storage unit 210 and the pixel value correction unit 220.

The configurations and the functions of the storage unit 310 are substantially similar to those of the storage unit 210, and the storage unit 310 includes a training database 316 instead of the training database 216.

The training database 316 stores training data (luminance training data) of the luminance prediction model related to the pixel value correction in addition to the training data of the colorization prediction model used by the colorization generation unit 230.

The correction parameter optimization unit 350 predicts correction parameters using the luminance prediction model and optimizes it. Note that the correction parameters are parameters related to the luminance distribution predicted by the luminance prediction model, and are the average and the standard deviation of the luminance distribution predicted in the second example embodiment. However, the correction parameters may be a minimum pixel value, a maximum pixel value, and the like of the predicted luminance distribution.

The luminance prediction model predicts correction parameters related to the luminance distribution of the monochrome image M which is necessary to ensure the reproduction accuracy of the color in the colorization process described later. The luminance prediction model may include a neural network, in particular, a CNN. In the second example embodiment, the correction parameter optimization unit 350 receives a processed monochrome image $M_{LN}$ that has been subjected to a predetermined luminance processing, and the luminance prediction model of the previous stage of the colorization prediction model is trained by machine learning using training data in which a color image $C_L$ corresponding to the aforementioned monochrome image $M_{LN}$ is used as an output. Note that the processed monochrome image $M_{LN}$ is an image corresponding to the color image $C_L$ for luminance learning. In the second example embodiment, the processed monochrome image $M_{LN}$ is a monochrome image $M_{L0}$ of which the luminance distribution has been randomly changed, the monochrome image $M_{L0}$ being obtained by converting the color image $C_L$ for luminance learning into a monochrome image. The process of randomly changing the luminance distribution may be performed during learning to extend data. Note that the correction parameter optimization unit 350 includes a learning processing unit 352 and a model optimization unit 354.

The learning processing unit 352 manages luminance training data. The learning processing unit 352 acquires a data set including the color image $C_L$ for luminance learning and the processed monochrome image $M_{LN}$, that is, the luminance training data, and stores it in the training database 316. Note that the luminance training data stored in the training database 316 may be data which the learning processing unit 352 has acquired from the acquisition unit 200 or data which the learning processing unit 352 has received from another apparatus via any communication means (not shown). Further, the learning processing unit 352 outputs the luminance training data stored in the training database 316 to the model optimization unit 354.

The model optimization unit 354 optimizes the luminance prediction model by machine learning using the luminance training data and then optimizes the correction parameters based on the luminance prediction model. In the second example embodiment, the model optimization unit 354 is connected to the pixel value correction unit 320 and the colorization generation unit 230. The model optimization unit 354 updates the luminance prediction model based on information output by the colorization generation unit 230 and information included in training data, so that the luminance prediction model learns correction parameters. The model optimization unit 354 outputs the optimized correction parameters to the pixel value correction unit 320.

The pixel value correction unit 320 corrects the luminance value of the monochrome image M0 based on information related to the pixel value. In the second example embodiment, the information related to the pixel value includes the correction parameters of the correction model output from the model optimization unit 354 of the correction parameter optimization unit 350. In the second example embodiment, the pixel value correction unit 320 includes a correction model including the correction parameters, and corrects the luminance value of the monochrome image M0 by using the correction model.

Note that the image processing according to the second example embodiment, which is performed by the apparatus 30, includes Steps similar to those shown in FIG. 4 according to the first example embodiment; however, the image processing according to the second example embodiment differs from that according to the first example embodiment in that the image processing according to the second example embodiment includes a second pixel value correction process instead of the first pixel value correction process shown in S102. The second pixel value correction process will be described below with reference to FIG. 7.

Figure 7:
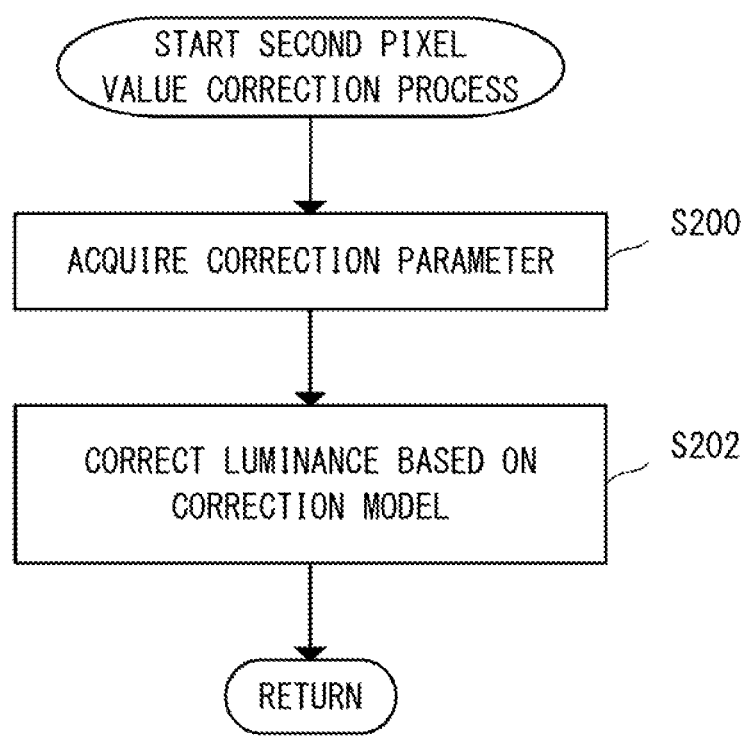
FIG. 7 is a flowchart showing a second pixel value correction process performed by a pixel value correction unit according to the second example embodiment.
Figure 8:
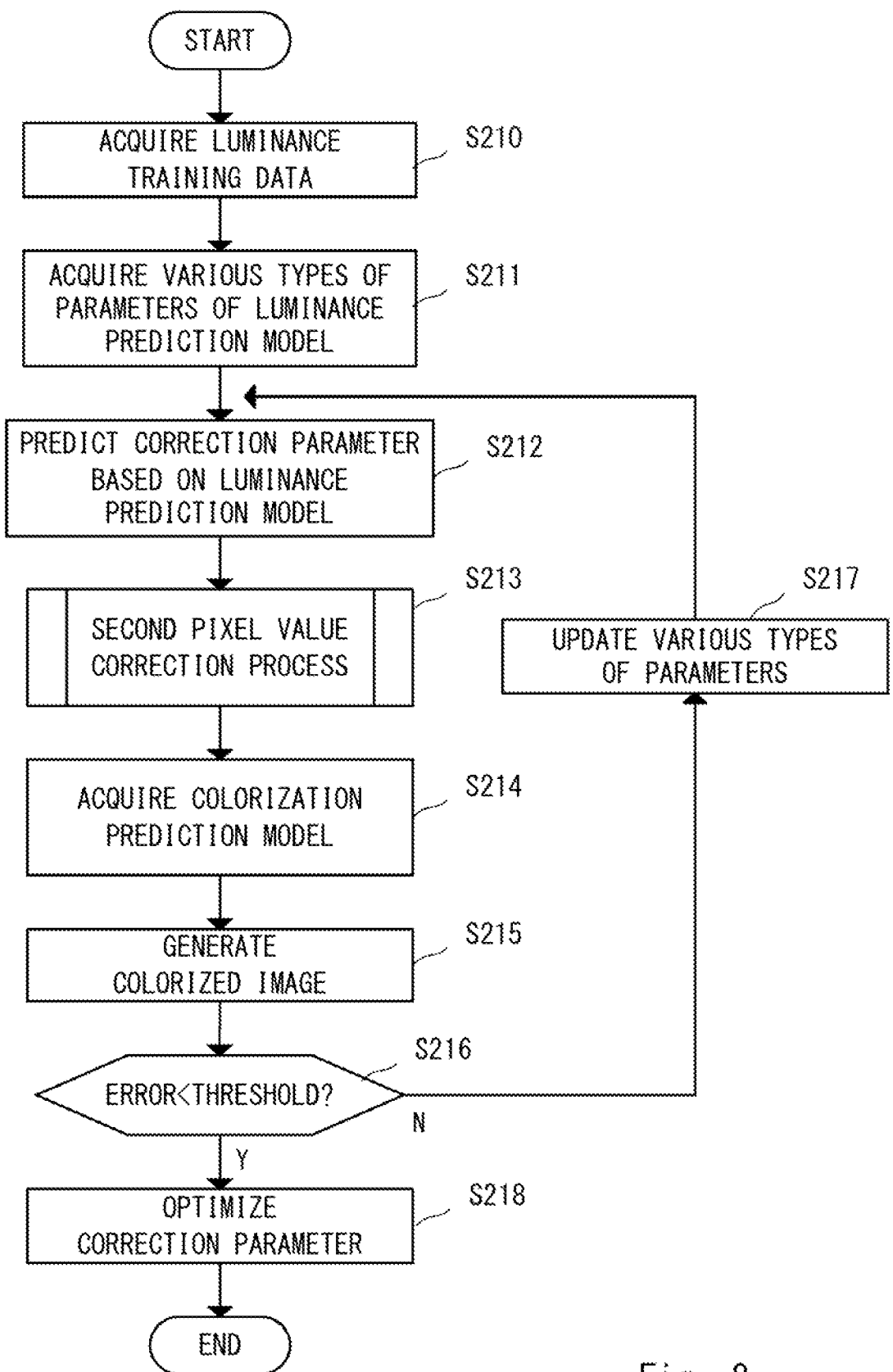
FIG. 8 is a flowchart showing a correction parameter optimization process performed by a correction parameter optimization unit according to the second example embodiment.

FIG. 7 is a flowchart showing the second pixel value correction process performed by the pixel value correction unit 320 according to the second example embodiment.

In S200, the pixel value correction unit 320 of the apparatus 30 acquires the correction parameters from the model optimization unit 354 of the correction parameter optimization unit 350.

Then, in S202, the pixel value correction unit 320 corrects the luminance value of the monochrome image M0 by using the correction model including the acquired correction parameters and thereby generates the monochrome image M1. For example, the pixel value correction unit 320 generates a luminance value histogram of the monochrome image M0 and calculates parameters (an average and a standard deviation of the luminance value histogram in this example) corresponding to the correction parameter from the luminance value histogram. Then the pixel value correction unit 320 corrects the luminance value of the monochrome image M0 so that the values of the calculated parameters approach the acquired correction parameters and thereby generates the monochrome image M1. Then the pixel value correction unit 320 outputs the monochrome image M1 to the colorization generation unit 230.

Next, a correction parameter optimization process will be described with reference to FIG. 8. FIG. 8 is a flowchart showing the correction parameter optimization process performed by the correction parameter optimization unit 350 according to the second example embodiment.

First, in S210, the model optimization unit 354 of the correction parameter optimization unit 350 acquires the luminance training data from the training database 316 via the learning processing unit 352. Note that the luminance training data includes the color image $C_L$ for luminance learning and the processed monochrome image $M_{LN}$ generated by preprocessing by the learning processing unit 352.

The details of the aforementioned preprocessing will be described below. In the preprocessing, the learning processing unit 352 converts the color image $C_L$ for luminance learning into a monochrome image while leaving the luminance thereof as it is, thereby generating the monochrome image $M_{LO}$. Then the learning processing unit 352 generates the processed monochrome image $M_{LN}$ by generating a luminance value histogram of the monochrome image $M_{LO}$ and randomly deforming the shape of the luminance value histogram. For example, the learning processing unit 352 generates two random numbers between the minimum value and the maximum value of the luminance value which the pixels can have, and converts the luminance value histogram of the monochrome image $M_{LO}$ so that the luminance value of the luminance value histogram is included between the two random numbers, and thereby generates the processed monochrome image $M_{LN}$. By doing so, it is possible to generate the processed monochrome image $M_{LN}$ of which the luminance of the image is deteriorated more than those of the color image $C_L$ for luminance learning and the monochrome image $M_{LO}$.

Next, in S211, the model optimization unit 354 acquires various types of parameters of the luminance prediction model.

Next, in S212, the model optimization unit 354 inputs the processed monochrome image $M_{LN}$ to the input layer of the luminance prediction model, and acquires predicted values (correction parameters) of the average and the standard deviation of the luminance distribution. Then the model optimization unit 354 outputs the acquired correction parameters to the pixel value correction unit 320.

Then, in S213, the pixel value correction unit 320 performs the second pixel value correction process and acquires the corrected monochrome image M1 corresponding to the processed monochrome image $M_{LN}$. Then the pixel value correction unit 320 outputs the acquired monochrome image M1 to the colorization generation unit 230.

In S214, the colorization generation unit 230 performs a process similar to that performed in S104 shown in FIG. 4 and acquires the colorization prediction model.

Then, in S215, the colorization generation unit 230 performs a process similar to that performed in S106 shown in FIG. 4 and generates the colorized image C. The colorization generation unit 230 outputs the output colorized image C to the model optimization unit 354 of the correction parameter optimization unit 350.

Next, in S216, the model optimization unit 354 calculates an error between the colorized image C and the color image $C_L$ for luminance learning based on a loss function, and determines whether or not the error is less than a threshold. In the second example embodiment, although the loss function is an L2 norm, it is not limited thereto, and the loss function may instead be an L1 norm or any other distance function. If the error is less than the threshold (Y in S216), the model optimization unit 354 advances the process to S218, while if the error is not less than the threshold (N in S216), it advances the process to S217.

In S217, the model optimization unit 354 calculates gradients of the correction parameters based on the error, and updates various types of parameters of the luminance prediction model based on the gradients. Note that the model optimization unit 354 may calculate the gradients using an error back propagation method. However, the model optimization unit 354 may instead directly calculate the gradients using any numerical calculation. Further, the model optimization unit 354 may update the various types of parameters using Stochastic Gradient Descent (SGD), Adam, or any optimization method.

Note that, at this time, the model optimization unit 354 does not update the parameters of the colorization prediction model.

Then, in S218, the model optimization unit 354 optimizes the luminance prediction model and then optimizes the correction parameters based on the luminance prediction model.

Note that the luminance training data may be classified into training data and test data, and the model optimization unit 354 may perform a process according to the cross validation in a luminance prediction model generation process.

As described above, according to the second example embodiment, the apparatus 30 corrects the luminance value of the monochrome image M0 so that the luminance distribution of the monochrome image M0 approaches the actual luminance distribution, and generates the colorized image C from the corrected monochrome image M1. Therefore, it is possible to improve the reproduction accuracy of the color in colorization of the monochrome image.

Third Example Embodiment

Next, a third example embodiment of the present disclosure will be described with reference to FIGS. 9 to 12. The third example embodiment is characterized in that a pixel value of the monochrome image M is corrected based on a color hint H.

Figure 9:
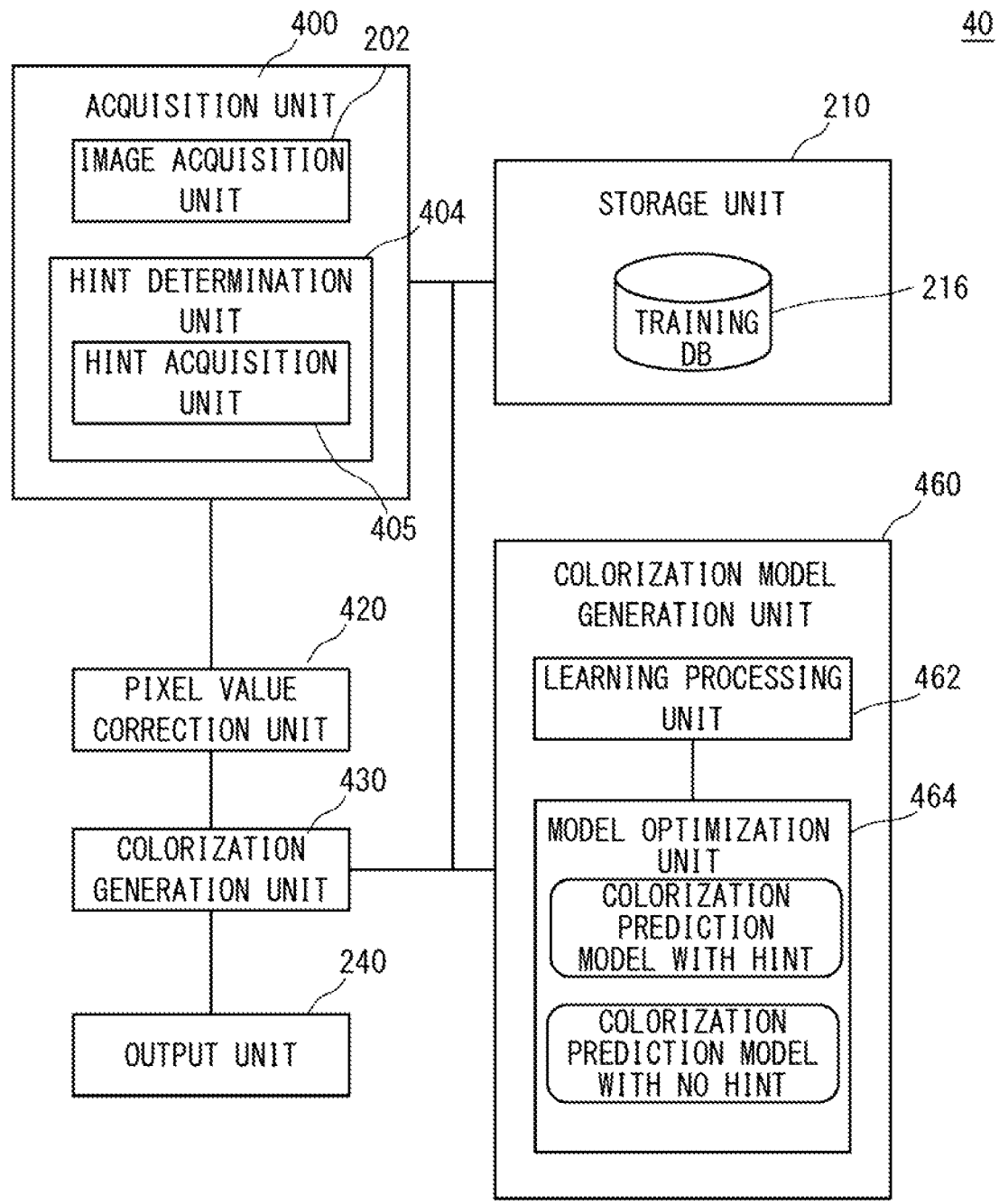
FIG. 9 is a diagram for explaining an outline of processes performed by an apparatus according to a third example embodiment.

FIG. 9 is a diagram for explaining an outline of processes performed by an apparatus 40 according to the third example embodiment. The apparatus 40 performs processes substantially similar to those performed by the apparatus 20 according to the first example embodiment. However, the apparatus 40 differs from the apparatus 20 in that it generates the monochrome image M1 from the monochrome image M0 by using the color hint H. The apparatus 40 also differs from the apparatus 20 in that it colors the monochrome image M by the colorization prediction model using the color hint H.

Note that, in the third example embodiment, a subject included in the monochrome image M (M0 and M1) includes one or a plurality of target parts. The target parts are parts of the subject which are similar in color. The target part may be a pixel region including a plurality of adjacent pixels in which differences between the pixel values are within a predetermined range. Examples of the target part include the skin of a person, the eyes of a person, the clothes of a person, the sky, a sunset, the trunk of a tree, a leaf, and grass.

Further, the color hint H is a color index indicating the color of the target part. In the third example embodiment, the color hint H is a color defined using a color space. The color hint H is included in information related to the pixel value used for a pixel value correction process of the monochrome image M. Further, the color hint H is a condition added to the colorization prediction model. In particular, the color hint H may be a condition added to an autoencoder included in the neural network. The color hint H improves the accuracy of predicting the color of each pixel of the monochrome image M.

Figure 10:
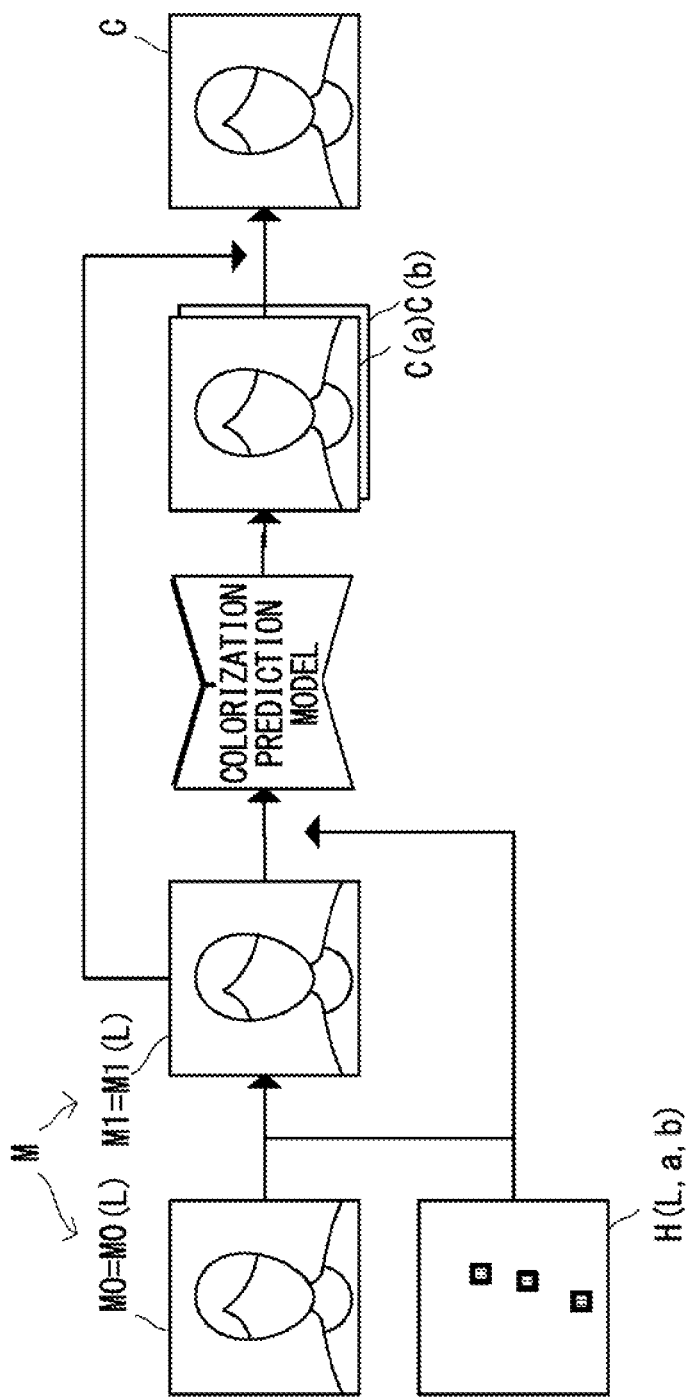
FIG. 10 is a schematic diagram of the apparatus according to the third example embodiment.

FIG. 10 is a schematic diagram of the apparatus 40 according to the third example embodiment. The configurations and the functions of the apparatus 40 are substantially similar to those of the apparatus 20 according to the first example embodiment. However, the apparatus 40 differs from the apparatus 20 in that the apparatus 40 includes an acquisition unit 400, a pixel value correction unit 420, and a colorization model generation unit 460 in place of the acquisition unit 200, the pixel value correction unit 220, the colorization generation unit 230, and the colorization model generation unit 260.

The configurations and the functions of the acquisition unit 400 are substantially similar to those of the acquisition unit 200, except that the acquisition unit 400 includes a hint determination unit 404 in place of the image acquisition unit 202.

The hint determination unit 404 determines the color hint H to be used for subsequent processes (the pixel value correction process and a colorization generation process), and outputs it to the pixel value correction unit 420 and the colorization generation unit 230. The hint determination unit 404 includes a hint acquisition unit 405.

The hint acquisition unit 405 receives, from a user, a designation of target position information P of the monochrome image M0 acquired by the image acquisition unit 202 and a designation of the color hint H of the target part, thereby acquiring the target position information P and the color hint H. Note that the target position information P may be position information of at least some of the pixels which compose the target part.

Note that, in the third example embodiment, the hint determination unit 404 determines that the color hint H acquired by the hint acquisition unit 405 is the color hint H to be used for the subsequent processes.

The pixel value correction unit 420, like the pixel value correction unit 220, corrects the pixel values of the monochrome image M0 based on the information related to the pixel value. However, the pixel value correction unit 420 corrects the pixel values of the monochrome image M0 based on the color hint H serving as the information related to the pixel value, in addition to performing the processes performed by the pixel value correction unit 220.

A colorization generation unit 430 generates the colorized image C corresponding to the monochrome image M from the corrected monochrome image M1 and the color hint H by using the colorization prediction model output from a model optimization unit 464, in addition to performing the processes performed by the colorization generation unit 230 according to the first example embodiment. Hereinafter, regarding the colorization prediction model used in the first example embodiment, the colorization prediction model that does not use the color hint H is referred to as a colorization prediction model with no hint, while the colorization prediction model that uses the color hint H is referred to as a colorization prediction model with a hint.

The colorization model generation unit 460 includes a learning processing unit 462 and the model optimization unit 464.

The configurations and the functions of the learning processing unit 462 are substantially similar to those of the learning processing unit 262, except that the learning processing unit 462 manages training data of the colorization prediction model with a hint in addition to managing training data of the colorization prediction model with no hint. The learning processing unit 462 outputs training data stored in the training database 216 to the model optimization unit 264.

The configurations and the functions of the model optimization unit 464 are substantially similar to those of the model optimization unit 264, except that the model optimization unit 464 optimizes the colorization prediction model with a hint by using training data in addition to optimizing the colorization prediction model with no hint. The model optimization unit 464 outputs the optimized colorization prediction models to the colorization generation unit 430.

Figure 11:
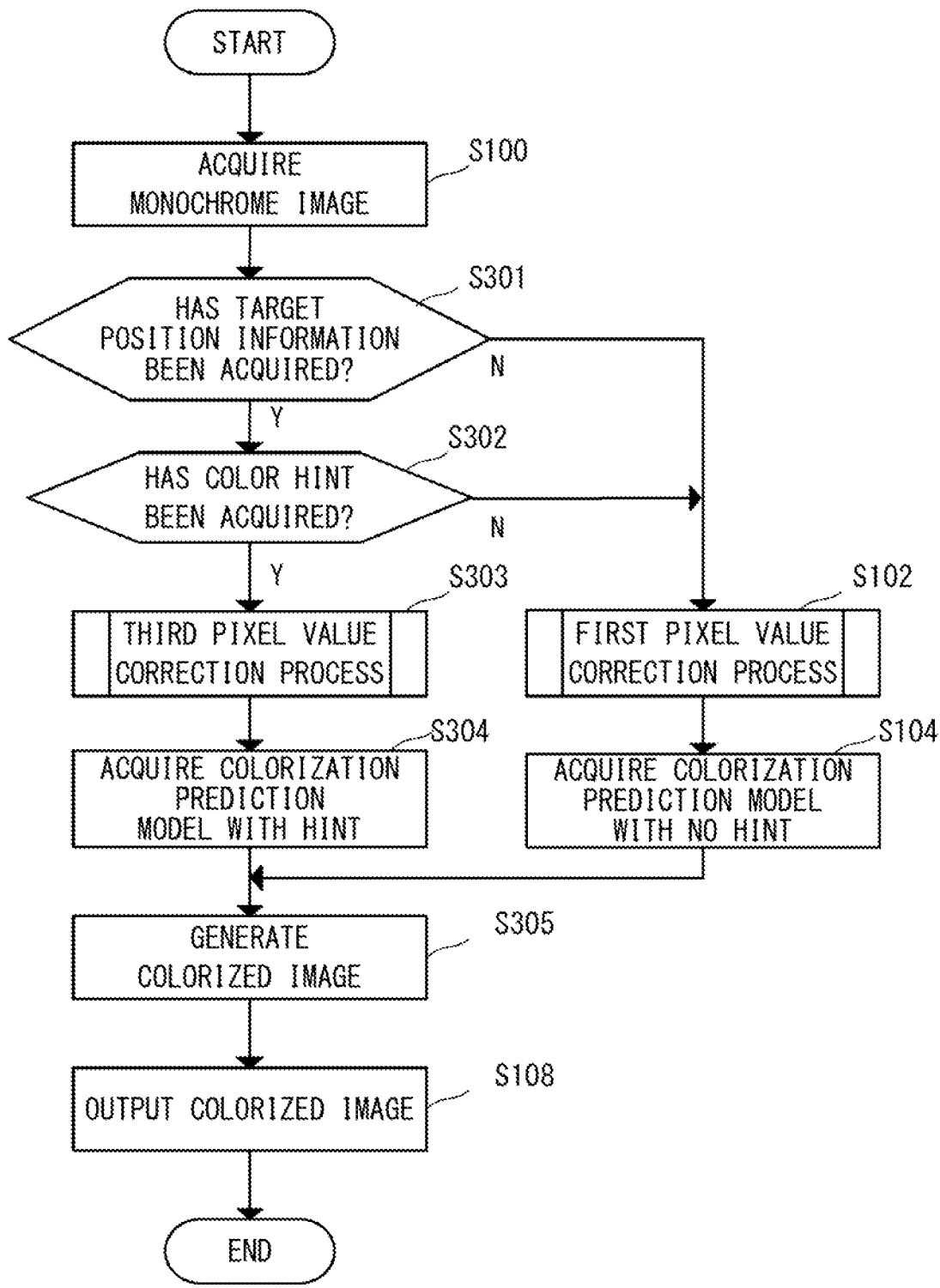
FIG. 11 is a flowchart showing image processing performed by the apparatus according to the third example embodiment.

FIG. 11 is a flowchart showing image processing performed by the apparatus 40 according to the third example embodiment. Steps shown in FIG. 11 include S301 to S305 instead of Steps S102 to S106 shown in FIG. 4 according to the first example embodiment. Note that Steps similar to those shown in FIG. 4 are denoted by the same reference symbols and the descriptions thereof will be omitted.

In S301, the hint acquisition unit 405 of the hint determination unit 404 determines whether or not the target position information P of the target part has been acquired in response to the acquisition of the monochrome image M0 in S100. For example, the hint acquisition unit 405 determines whether or not a user has designated at least some pixels of the monochrome image M0 displayed on the user interface (not shown) of the apparatus 40 by means of a pointing device or the like. If the hint acquisition unit 405 has acquired the target position information P (the user has designated the pixels) (Y in S301), it advances the process to S302, while if the hint acquisition unit 405 has not acquired the target position information P (the user has not designated the pixels) (N in S301), it advances the process to S102.

In S302, the hint acquisition unit 405 determines whether or not it has acquired the color hint H of the target part. For example, the hint acquisition unit 405 determines whether or not a user has designated a color included in a color palette displayed on the user interface, a color in the color space, or the like. If the hint acquisition unit 405 has acquired the color hint (the user has designated the color) (Y in S302), it associates the color hint with one or a plurality of pixels corresponding to the target position information P of the target part. Then the hint acquisition unit 405 superimposes the color indicated by the color hint H on the pixels on the monochrome image M0 displayed on the user interface corresponding to the target position information P, and advances the process to S303. If the hint acquisition unit 405 has not acquired the color hint (the user has not designated the color) (N in S302), it advances the process to S102.

In S303, the pixel value correction unit 420 performs a third pixel value correction process on the output monochrome image M0 in response to the acquisition of the color hint H, and thereby generates the monochrome image M1. Note that the details of the third pixel value correction process will be described later. The pixel value correction unit 420 outputs the monochrome image M1 to the colorization generation unit 430.

Next, in S304, the colorization generation unit 430 acquires the colorization prediction model with a hint from the model optimization unit 464. Then the colorization generation unit 430 advances the process to S305.

Note that, in S301 and S302, when the hint acquisition unit 405 has not acquired one of the target position information P and the color hint H, the pixel value correction unit 420 performs the first pixel value process in S102 and thereby generates the monochrome image M1. Then the pixel value correction unit 420 advances the process to S104.

In S104, the colorization generation unit 430 acquires the colorization prediction model with no hint from the model optimization unit 464. Then the colorization generation unit 430 advances the process to S305.

In S305, the colorization generation unit 430 uses the monochrome image M1 output from the pixel value correction unit 420 as input data and generates the colorized image C corresponding to the monochrome image M by using the acquired colorization prediction model. At this time, when the colorization prediction model is the colorization prediction model with a hint, the colorization generation unit 430 generates the colorized image C with the color hint H as a condition. Then the colorization generation unit 430 outputs the colorized image C to the output unit 240.

Note that the hint acquisition unit 405 may, instead of performing the processes shown in S102 and S104, output a signal indicating an error and end the process.

Further, in the third example embodiment, the colorization prediction model with a hint and the colorization prediction model with no hint have been described without being distinguished from each other. However, the colorization prediction model with a hint may include the colorization prediction model with no hint, and perform prediction processes similar to those performed by the colorization prediction model with no hint when the color hint H is not input. In this case, the pixel value correction unit 420 may perform the process of S102 and then advance the process to S304, and S104 may thus be omitted. Note that the process of S102 may be omitted.

Figure 12:
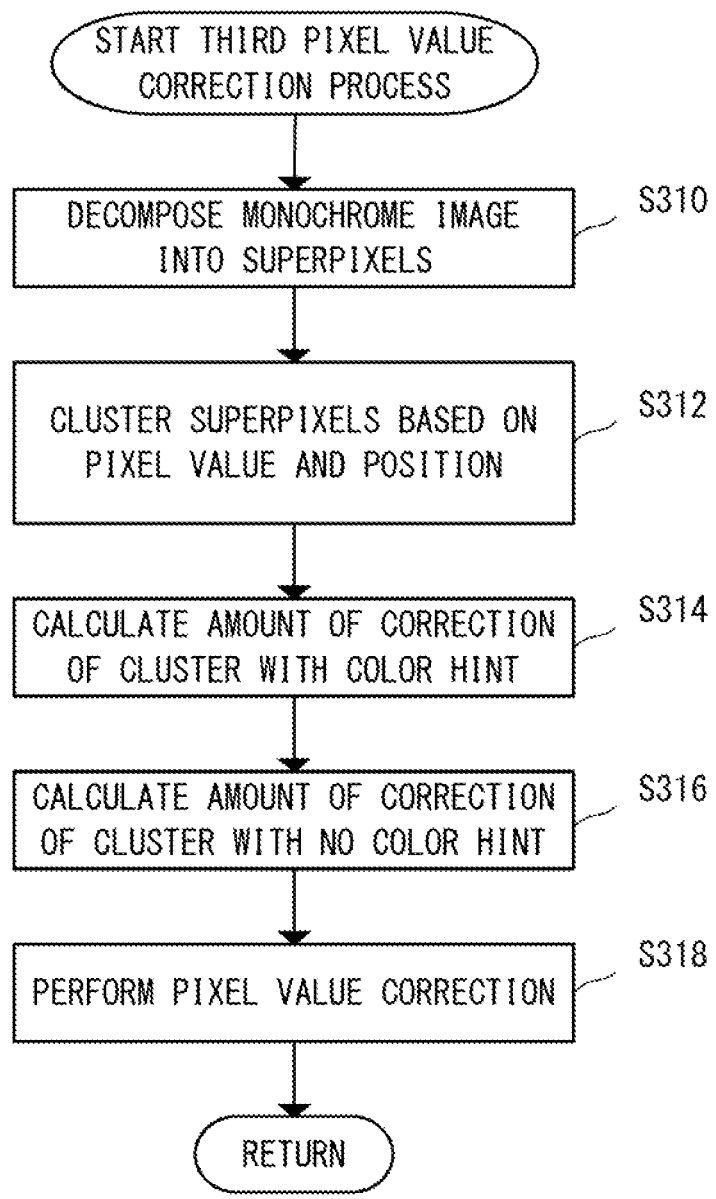
FIG. 12 is a flowchart showing a third pixel value correction process performed by a pixel value correction unit according to the third example embodiment.

FIG. 12 is a flowchart showing the third pixel value correction process performed by the pixel value correction unit 420 according to the third example embodiment.

First, in S310, the pixel value correction unit 420 decomposes a plurality of pixels included in the monochrome image M0 into superpixels based on the pixel values and the pixel positions. For example, the pixel value correction unit 420 groups pixels in which the difference between the pixel values is equal to or less than a predetermined threshold and the distance between the pixels is equal to or less than a predetermined threshold as one superpixel. In this way, the pixel values and the pixels close to each other are classified into the same superpixel.

Next, in S312, the pixel value correction unit 420 further clusters the superpixels based on the representative value of the pixel values and the representative pixel position of the superpixels. Note that the representative value of the pixel values of the superpixels may be an average value of the pixel values of the pixels included in the superpixels. Further, the representative pixel position of the superpixels may be the pixel coordinate of the center of the superpixel. For example, the pixel value correction unit 420 may perform clustering using k-means clustering based on these values. By doing so, the superpixels of which the representative values of the pixel values and the representative pixel positions are close to each other are classified into the same cluster. Note that it is assumed that each of the clusters classified here indicates the target part of the subject.

Next, in S314, the pixel value correction unit 420 calculates an amount of correction of the pixel values of the cluster based on the representative value of the pixel values of the cluster including one or a plurality of pixels associated with the color hint H and the pixel value corresponding to the color indicated by the color hint H. Note that the representative value of the pixel values of the cluster may be an average value of the pixel values of the pixels included in the cluster, or may be an average value of the pixel values of the pixels associated with the color hint H.

Then, in S316, the pixel value correction unit 420 calculates an amount of correction of the pixel values of another cluster that does not include the color hint H based on the amount of correction of the pixel values of the cluster including the color hint H.

In S318, the pixel value correction unit 420 corrects the pixel values of the pixels of the monochrome image M0 based on the calculated amount of correction of the pixel values. At this time, the pixel value correction unit 420 may perform the correction in accordance with the amounts of correction of the pixel values calculated in S314 and S316 for the pixels included in the corresponding cluster. Further, the pixel value correction unit 420 may calculate a representative value of, for example, the average values, the intermediate values, or the median values of the amounts of correction of the pixel values calculated in S314 and S316, and correct a pixel value level of the entire monochrome image M0 by using the calculated representative value. At this time, the pixel value correction unit 420 may use some or all of the amounts of correction of the pixel values calculated in S314 and S316 in order to calculate the representative value.

As described above, the pixel value correction unit 420 can determine the amount of correction of the pixel values of the pixels included in the monochrome image M0 based on the pixel values of one or a plurality of pixels included in the monochrome image M0 and the pixel value corresponding to the color hint H associated with the one or the plurality of pixels.

As described above, according to the third example embodiment, the pixel value correction unit 420 corrects the pixel values based on the color hint H, and the colorization generation unit 430 generates the colorized image C from the corrected monochrome image M1. Therefore, it is possible to improve the reproduction accuracy of the color in colorization of the monochrome image.

Note that the color hint H used in the pixel value correction process and the colorization generation process is preferably a "preferred color" as a photographic image, in particular, a color that conforms to human color perception. The hint acquisition unit 405 of the apparatus 40 according to the third example embodiment may include a color palette having the "preferred color" so that this color palette can be displayed on the user interface. Further, the hint acquisition unit 405 may acquire the color hint H when a user has designated the "preferred color" from the color palette.

Note that the above "preferred color" may have reflectance characteristics under predetermined light sources such as sunlight and white light sources. Further, the "preferred color" may be a color empirically determined based on human color perception.

Further, when the color difference between the color of the object under a predetermined light source and the color of the object displayed on the predetermined display apparatus is small (preferably minimal), the "preferred color" may be the color of an object displayed on a predetermined display apparatus. For example, the "preferred color" can be determined as follows. First, the color of an object is detected by a first image sensor, the detected color is then displayed on a predetermined display apparatus, and then the displayed color is further detected by a second image sensor. At this time, when the color difference between the color detected by the first image sensor and the color detected by the second image sensor becomes small (preferably minimal), the color detected by the second image sensor can be set to the "preferred color" of the object.

Fourth Example Embodiment

Next, a fourth example embodiment of the present disclosure will be described with reference to FIGS. 13 to 18. In the third example embodiment, the color hint H used in the pixel value correction process and the colorization generation process is a color hint H acquired by receiving a designation of it from a user. The fourth example embodiment is characterized in that the color hint H used in the pixel value correction process and the colorization generation process is a color hint H obtained by converting the color hint H acquired from a user into the above-described "preferred color".

Figure 13:
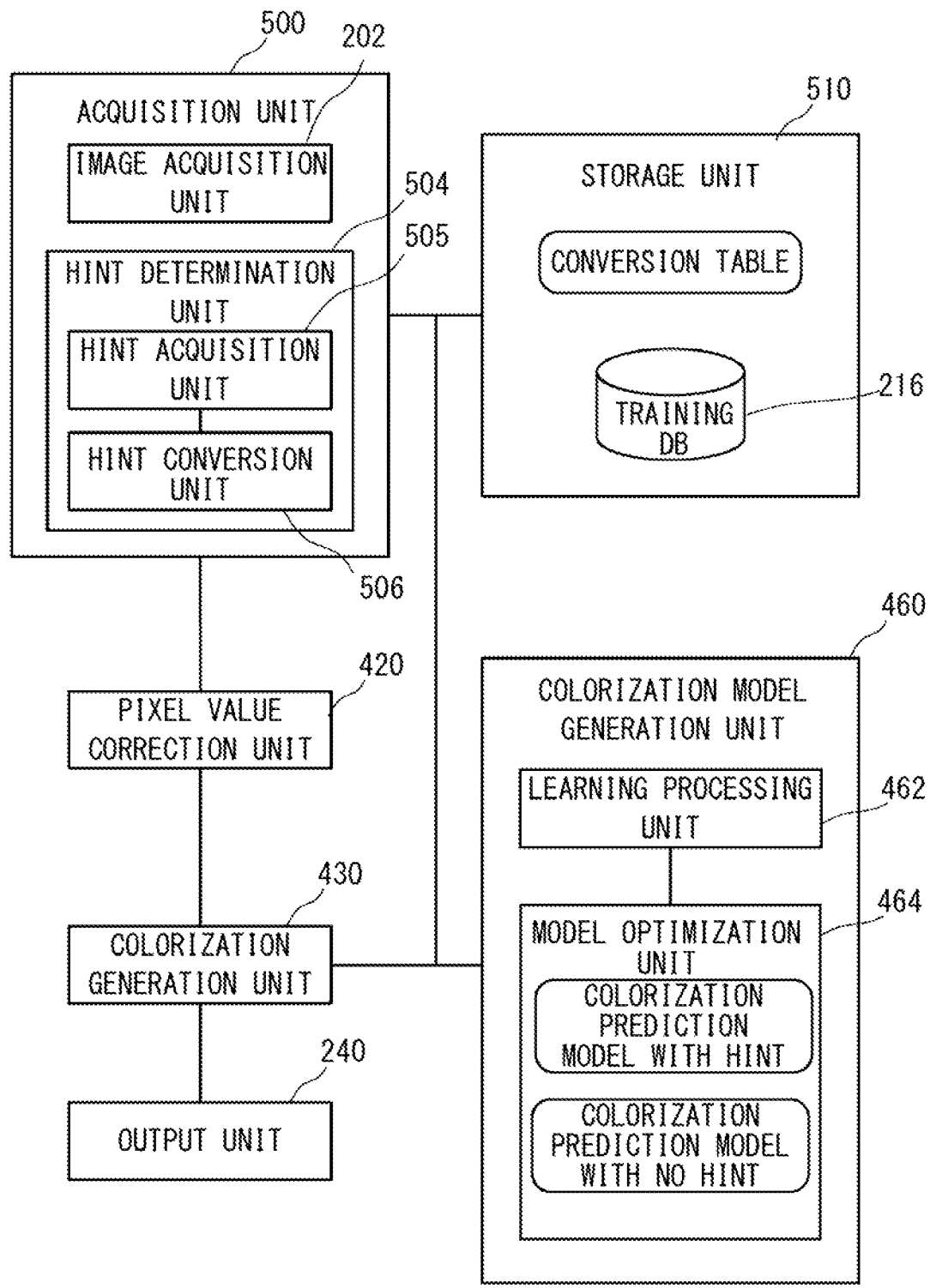
FIG. 13 is a schematic diagram of an apparatus according to a fourth example embodiment.

FIG. 13 is a schematic diagram of an apparatus 50 according to the fourth example embodiment.

The configurations and the functions of the apparatus 50 are substantially similar to those of the apparatus 40 according to the third example embodiment. However, the apparatus 50 differs from the apparatus 40 in that the apparatus 50 includes an acquisition unit 500 and a storage unit 510 in place of the acquisition unit 400 and the storage unit 210.

The configurations and the functions of the acquisition unit 500 are substantially similar to those of the acquisition unit 400, except that the acquisition unit 500 includes a hint determination unit 504 in place of the hint determination unit 404.

The hint determination unit 504, like the hint determination unit 404, acquires the color hint H and determines that it is the color hint H to be used for subsequent processes. However, in the fourth example embodiment, the color hint H includes a first color hint and a second color hint, and the hint determination unit 504 acquires the first color hint of the target part of the subject in the monochrome image M0 and then determines the second color hint. Note that the first color hint is a color hint designated by a user as a color indicating the color of the target part of the subject. Further, the second color hint is a "preferred color" according to the first color hint and is a color hint input to the colorization prediction model with a hint as a condition. The hint determination unit 504 includes a hint acquisition unit 505 and a hint conversion unit 506 in place of the hint acquisition unit 405.

The hint acquisition unit 505 acquires a category of the target part in addition to the target position information P of the monochrome image M and the first color hint of the target part. Note that the category is information indicating the type of the target part, for example, "the skin of a person", "the eyes of a person", "the sky", "a sunset", "the trunk of a tree", "a leaf", and "grass".

The hint conversion unit 506 converts the first color hint into the second color hint based on the category acquired by the hint acquisition unit 505. The hint conversion unit 506 may convert the first color hint into the second color hint using a conversion table stored in the storage unit 510. The hint conversion unit 506 outputs the second color hint to the pixel value correction unit 420 and the colorization generation unit 430.

The configurations and the functions of the storage unit 510 are substantially similar to those of the storage unit 210, and in addition, the storage unit 510 stores various types of data related to a color hint conversion process. The storage unit 510 includes the conversion table in addition to the training database 216.

The conversion table is a table for associating a category for the target part with parameters and the like related to a color hint conversion process and storing them. The details thereof will be described later.

Note that the pixel value correction unit 420 corrects the pixel values of the monochrome image M based on the second color hint output from the hint conversion unit 506 as information related to the pixel value.

Further, the colorization generation unit 430 generates the colorized image C corresponding to the monochrome image M from the second color hint output from the hint conversion unit 506 by using the colorization prediction model with a hint.

Figure 14:
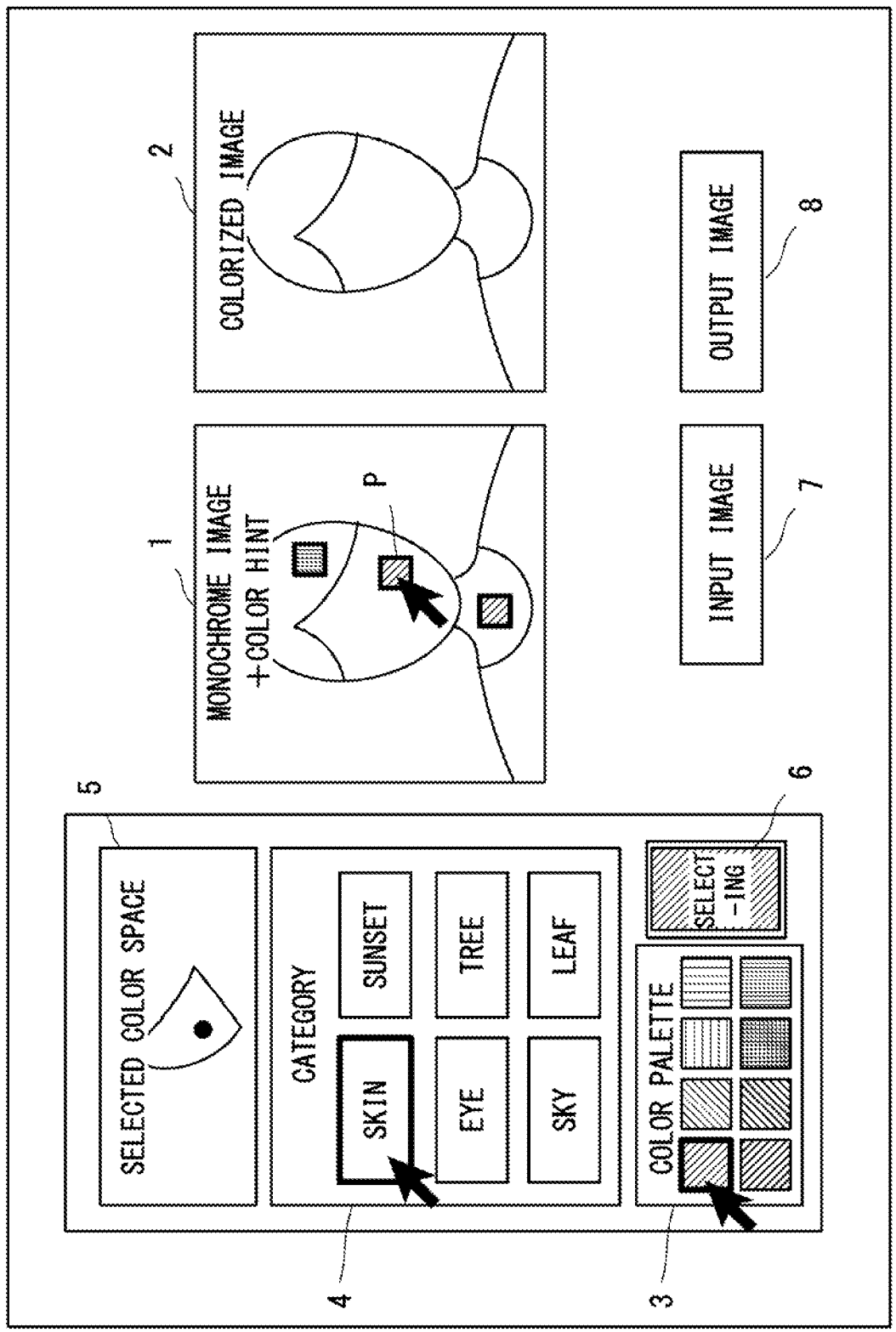
FIG. 14 is a diagram showing an example of a user interface of the apparatus according to the fourth example embodiment.

FIG. 14 is a diagram showing an example of a user interface of the apparatus 50 according to the fourth example embodiment. For example, the user interface includes a monochrome image display unit 1, a colorized image display unit 2, a color palette 3, a category input unit 4, a color space display unit 5, a hint display unit 6, an image input unit 7, and an image output unit 8.

The monochrome image display unit 1 superimposes the color indicated by the first color hint or the second color hint on the pixels corresponding to the target position information P of the target part of the acquired monochrome image M0 and displays this monochrome image M0. Note that the monochrome image display unit 1 receives an input of the target position information P from a user via a pointing device or the like. The monochrome image display unit 1 may be included in the hint determination unit 504 and connected to the hint acquisition unit 505.

The colorized image display unit 2 displays the generated colorized image C. The colorized image display unit 2 is included in the output unit 240.

The color palette 3 is a general-purpose color palette that holds a plurality of colors and receives a designation of a color from a user. The designated color is the first color hint. The color palette 3 is included in the hint acquisition unit 505 of the hint determination unit 504.

The category input unit 4 displays a list of categories for the target part and receives an input of the category from a user. The category input unit 4 may be included in the hint determination unit 504 and connected to the hint acquisition unit 505.

The color space display unit 5 displays in the color space the color hint (the first color hint for which a designation is received from a user or the converted second color hint) selected at this point in time. The color space display unit 5 may receive a designation of a color (i.e., an input of the first color hint) from a user via a pointing device or the like.

The hint display unit 6 displays the color hint selected at this point in time by a color.

The image input unit 7, which is included in the image acquisition unit 202, receives an input of the monochrome image M from a user.

The image output unit 8, which is included in the output unit 240, outputs the colorized image C to the outside in a predetermined data format.

Figure 15:
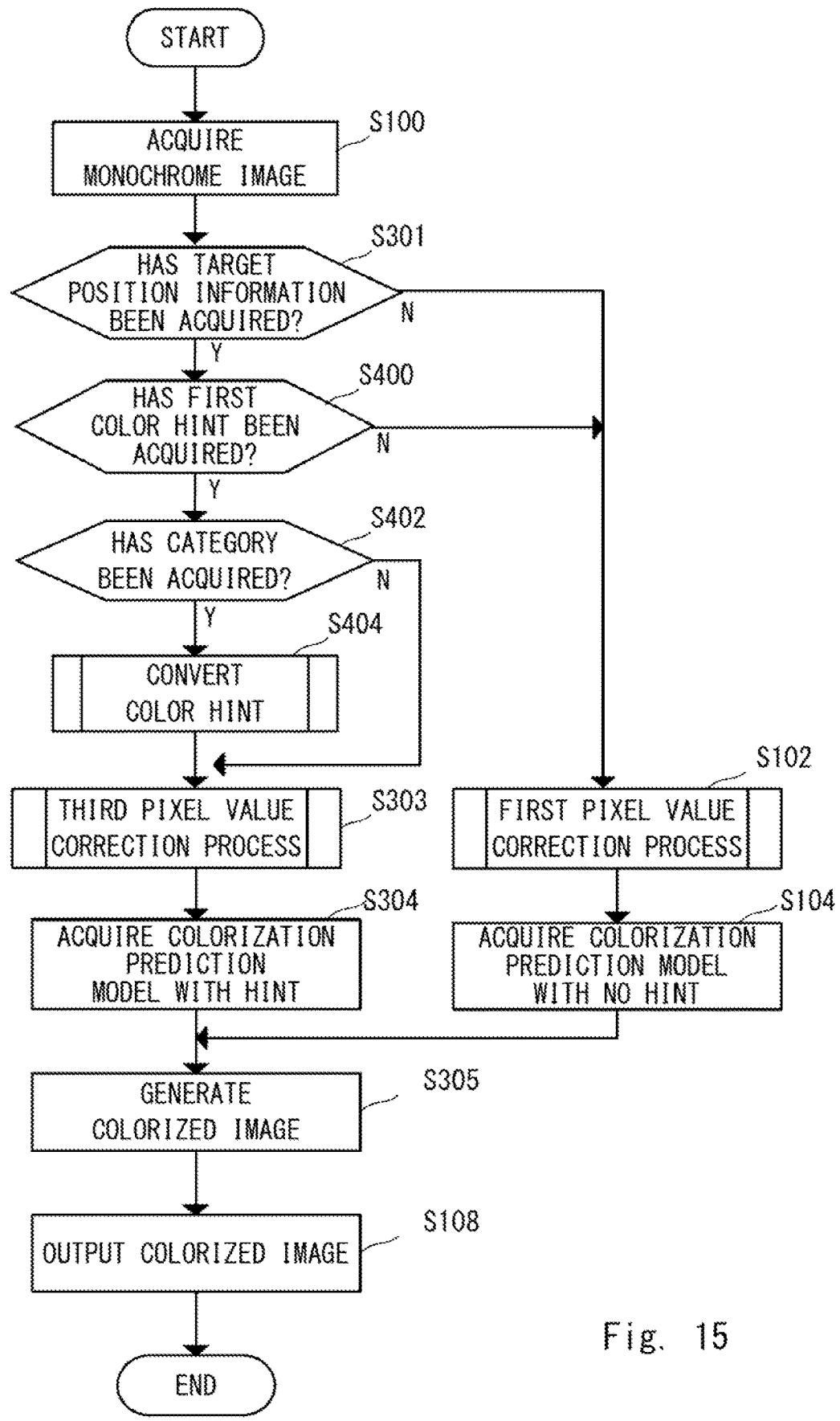
FIG. 15 is a flowchart showing image processing performed by the apparatus according to the fourth example embodiment.

Next, processes performed by the apparatus 50 according to the fourth example embodiment will be described with reference to FIGS. 14 and 15. FIG. 15 is a flowchart showing image processing performed by the apparatus 50 according to the fourth example embodiment. Instead of Step S302 shown in FIG. 11 according to the third example embodiment, Steps shown in FIG. 15 include S400 to S404. Note that Steps similar to those shown in FIG. 11 are denoted by the same reference symbols and the descriptions thereof will be omitted.

In S400, when the hint acquisition unit 505 has acquired the target position information P of the target part in S301, the hint acquisition unit 505 determines whether or not it has acquired the first color hint of the target part. For example, the hint acquisition unit 505 determines whether or not a user has designated a color included in the color palette 3 shown in FIG. 14 or a color displayed on the color space display unit 5. If the hint acquisition unit 505 has acquired the first color hint (the user has designated the color) (Y in S400), the hint acquisition unit 505 superimposes the color indicated by the first color hint on the pixels of the monochrome image M of the monochrome image display unit 1 corresponding to the target position information P and displays it as shown in FIG. 14, and advances the process to S402. If the hint acquisition unit 505 has not acquired the first color hint (the user has not designated the color) (N in S400), it advances the process to S102.

In S402, the hint acquisition unit 505 determines whether or not it has acquired the category of the target part. For example, the hint acquisition unit 505 determines whether or not a user has designated the category displayed in the category input unit 4. If the hint acquisition unit 505 has acquired the category (the user has designated the category) (Y in S402), the hint acquisition unit 505 advances the process to S404, while if the hint acquisition unit 505 has not acquired the category (the user has not designated the category) (N in S402), it outputs the first color hint to the pixel value correction unit 420 and the colorization generation unit 430 and advances the process to S303.

In S404, the hint conversion unit 506 refers to the conversion table of the storage unit 510 and converts the first color hint into the second color hint in accordance with the acquired category. Details of this process for converting the color hint will be described later. The hint conversion unit 506 outputs the second color hint to the pixel value correction unit 420 and the colorization generation unit 430. Further, as shown in FIG. 14, the hint conversion unit 506 superimposes the color indicated by the second color hint, instead of the color indicated by the first color hint, on the pixels of the monochrome image M of the monochrome image display unit 1 corresponding to the target position information P and displays it.

As described above, according to the fourth example embodiment, the hint conversion unit 506 converts the first color hint into the second color hint based on the categories. Therefore, the apparatus 50 can perform color adjustment of the designated color hint based on the categories and then perform the pixel value correction process and the colorization generation process using the color hint that has been converted into the "preferred color". Thus, it is possible to more easily improve the reproduction accuracy of the color in colorization of the monochrome image.

Next, the color hint conversion process (i.e., the process of S404 shown in FIG. 15) using a conversion table performed by the hint conversion unit 506 will be described. The conversion table may include at least one of a first conversion table, a second conversion table, and a third conversion table, and the hint conversion unit 506 may perform the conversion process in accordance with the type of the conversion table stored in the storage unit 510.

Figure 16B:
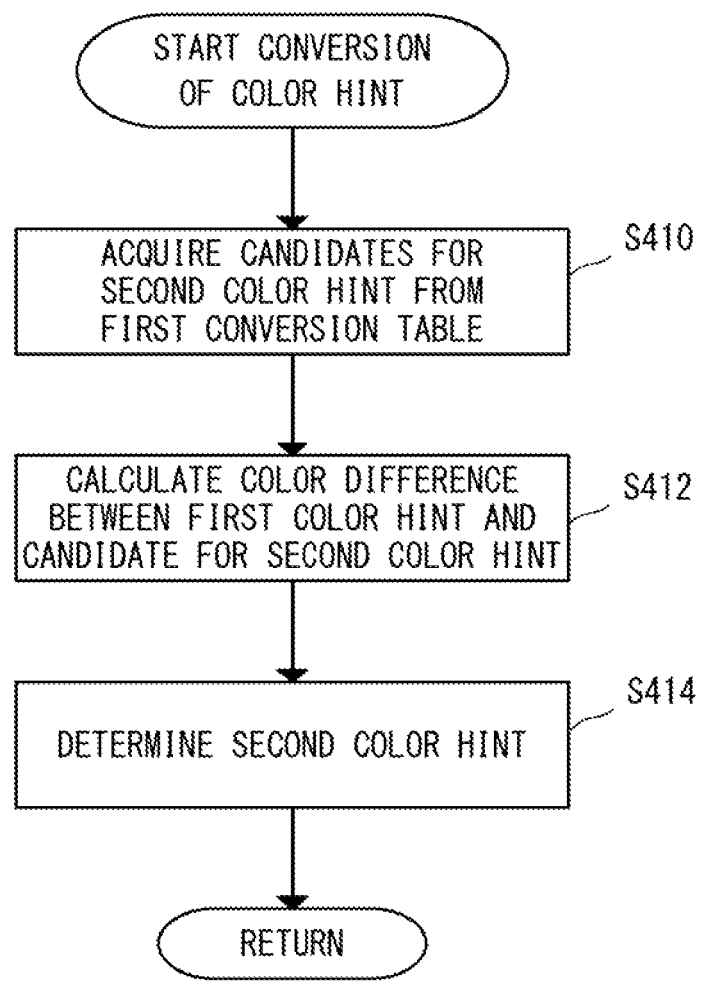
FIG. 16B is a flowchart showing a color hint conversion process using the first conversion table according to the fourth example embodiment.

FIG. 16A is a diagram showing an example of a data structure of the first conversion table according to the fourth example embodiment, and FIG. 16B is a flowchart showing the color hint conversion process using the first conversion table.

The first conversion table is a table for associating the category of the target part with a plurality of candidates for the second color hint and storing them. As shown in FIG. 16A, the first conversion table may include the category of the target part and color space coordinates of the plurality of candidates for the second color hint corresponding to the category. The color space coordinates include components (i.e., pixel values) corresponding to the dimensions of the color space, and in FIG. 16A, the color space coordinates include three components L, a, and b respectively corresponding to the luminance dimension (L) and the complementary color dimensions. Note that the candidate for the second color hint may be a color predetermined as the above-described "preferred color" in accordance with the category.

As shown in FIG. 16B, in S410, the hint conversion unit 506 first acquires the color space coordinates of the plurality of candidates for the second color hint corresponding to the acquired category by using the first conversion table.

Next, in S412, the hint conversion unit 506 calculates a color difference between the first color hint and each of the candidates for the second color hint, that is, a distance between the color space coordinates of the first color hint and the color space coordinates of each of the candidates for the second color hint. Note that the distance may be the Euclidean distance, the Manhattan distance, the Chebyshev distance, or any other distance.

Next, in S414, the hint conversion unit 506 selects the candidate for the second color hint in which a color difference between it and the first color hint is the smallest from among the candidates for the second color hint, and determines that the selected candidate is the second color hint.

As described above, by using the first conversion table, the hint conversion unit 506 can easily determine, as the second color hint, the color closest to the color (the first color hint) designated by a user among the preferred colors predetermined for the respective categories.

Figure 17B:
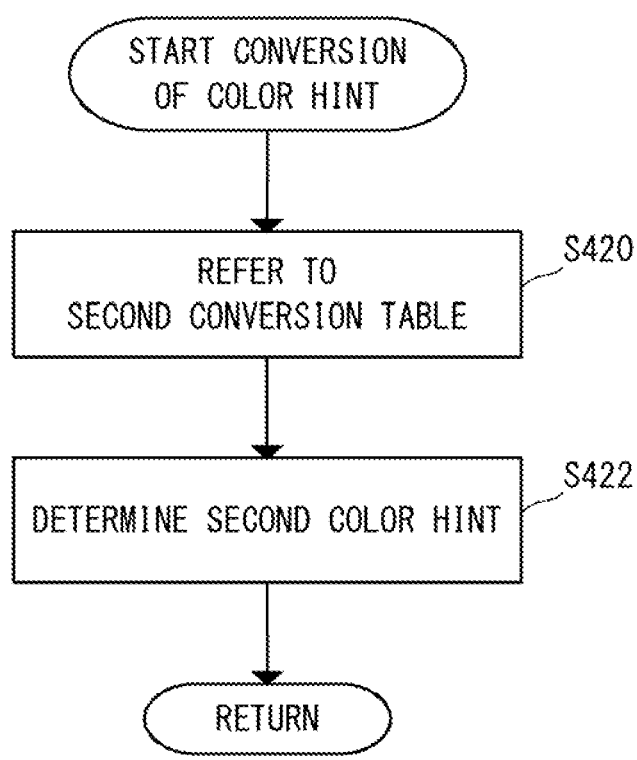
FIG. 17B is a flowchart showing a color hint conversion process using the second conversion table according to the fourth example embodiment.

FIG. 17A is a diagram showing an example of a data structure of the second conversion table according to the fourth example embodiment, and FIG. 17B is a flowchart showing the color hint conversion process using the second conversion table.

The second conversion table is a table for associating the first color hint, the category of the target part, and the second color hint with each other and storing them. As shown in FIG. 17A, the second conversion table stores, as the second color hint, color space coordinates assigned in accordance with a range of the color space coordinates of the first color hint for each category. Note that the second color hint may be a color predetermined as the above-described "preferred color" corresponding to the color space of the first color hint for each category.

As shown in FIG. 17B, in S420, the hint conversion unit 506 first refers to the second conversion table.

Next, in S422, the hint conversion unit 506 acquires the second color hint associated with a range corresponding to the acquired category and components of the color space coordinates of the first color hint.

As described above, by using the second conversion table, the hint conversion unit 506 can easily determine, as the second color hint, the "preferred color" predetermined so that it corresponds to the color designated by a user for each category.

Figure 18B:
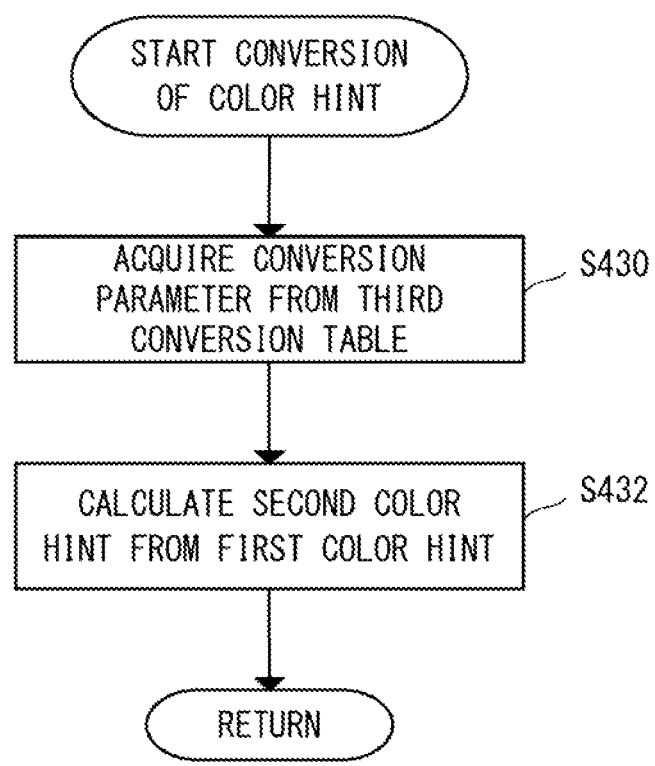
FIG. 18B is a flowchart showing a color hint conversion process using the third conversion table according to the fourth example embodiment.

FIG. 18A is a diagram showing an example of a data structure of the third conversion table according to the fourth example embodiment, and FIG. 18B is a flowchart showing the color hint conversion process using the third conversion table.

As shown in FIG. 18A, the third conversion table stores a conversion parameter for converting the first color hint into the second color hint, which parameter corresponds to the category of the target part.

As shown in FIG. 18B, in S430, the hint conversion unit 506 first acquires the conversion parameter corresponding to the acquired category, which parameter is stored in the third conversion table.

Next, as shown in S432, the hint conversion unit 506 calculates the second color hint from the first color hint using the conversion parameters.

As described above, by using the third conversion table, the hint conversion unit 506 can perform arithmetic processing on the color designated by a user based on the conversion parameters predetermined for the respective categories and easily determine a result of the output as the second color hint.

Fifth Example Embodiment

Next, a fifth example embodiment of the present disclosure will be described with reference to FIGS. 19 to 21. The fifth example embodiment is characterized in that the color hint H acquired from a user is converted into a "preferred color" and the color of the converted color hint is further adjusted.

Figure 19:
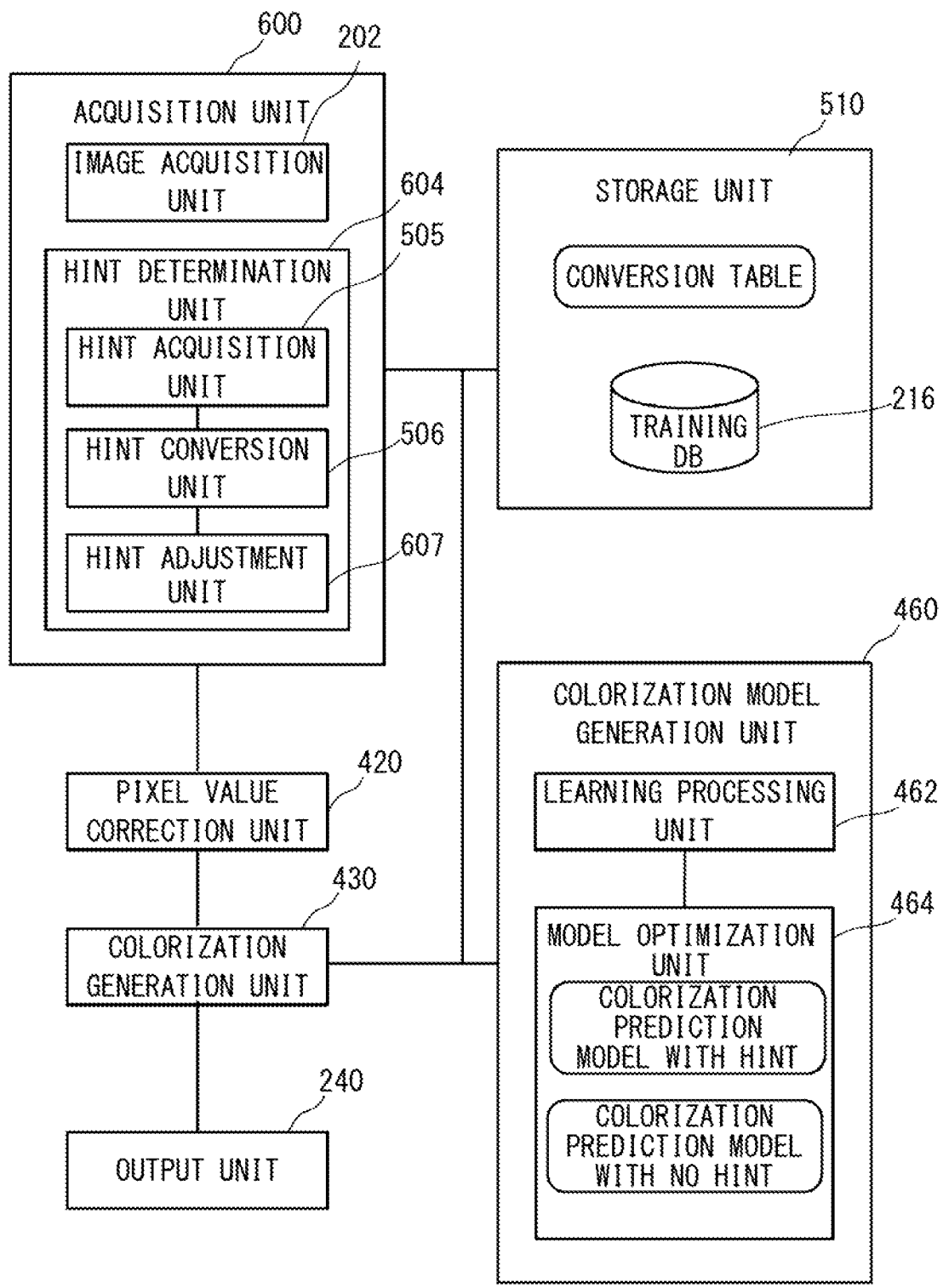
FIG. 19 is a schematic diagram of an apparatus according to a fifth example embodiment.

FIG. 19 is a schematic diagram of an apparatus 60 according to the fifth example embodiment. The configurations and the functions of the apparatus 60 are substantially similar to those of the apparatus 50 according to the fourth example embodiment. However, the apparatus 60 differs from the apparatus 50 in that the apparatus 60 includes an acquisition unit 600 in place of the acquisition unit 500.

The configurations and the functions of the acquisition unit 600 are substantially similar to those of the acquisition unit 500, except that the acquisition unit 600 includes a hint determination unit 604 in place of the hint determination unit 504.

The hint determination unit 604 includes a hint adjustment unit 607 in addition to the configuration of the hint determination unit 504.

The hint adjustment unit 607 adjusts the converted color space coordinates of the second color hint output from the hint conversion unit 506 based on the distance between the converted color space coordinates of the second color hint and the color space coordinates of the first color hint.

Note that the pixel value correction unit 420 corrects the pixel value of the monochrome image M based on the adjusted second color hint output from the hint adjustment unit 607 as information related to the pixel value.

Further, the colorization generation unit 430 generates the colorized image C corresponding to the monochrome image M based on the adjusted second color hint output from the hint adjustment unit 607.

Figure 20:
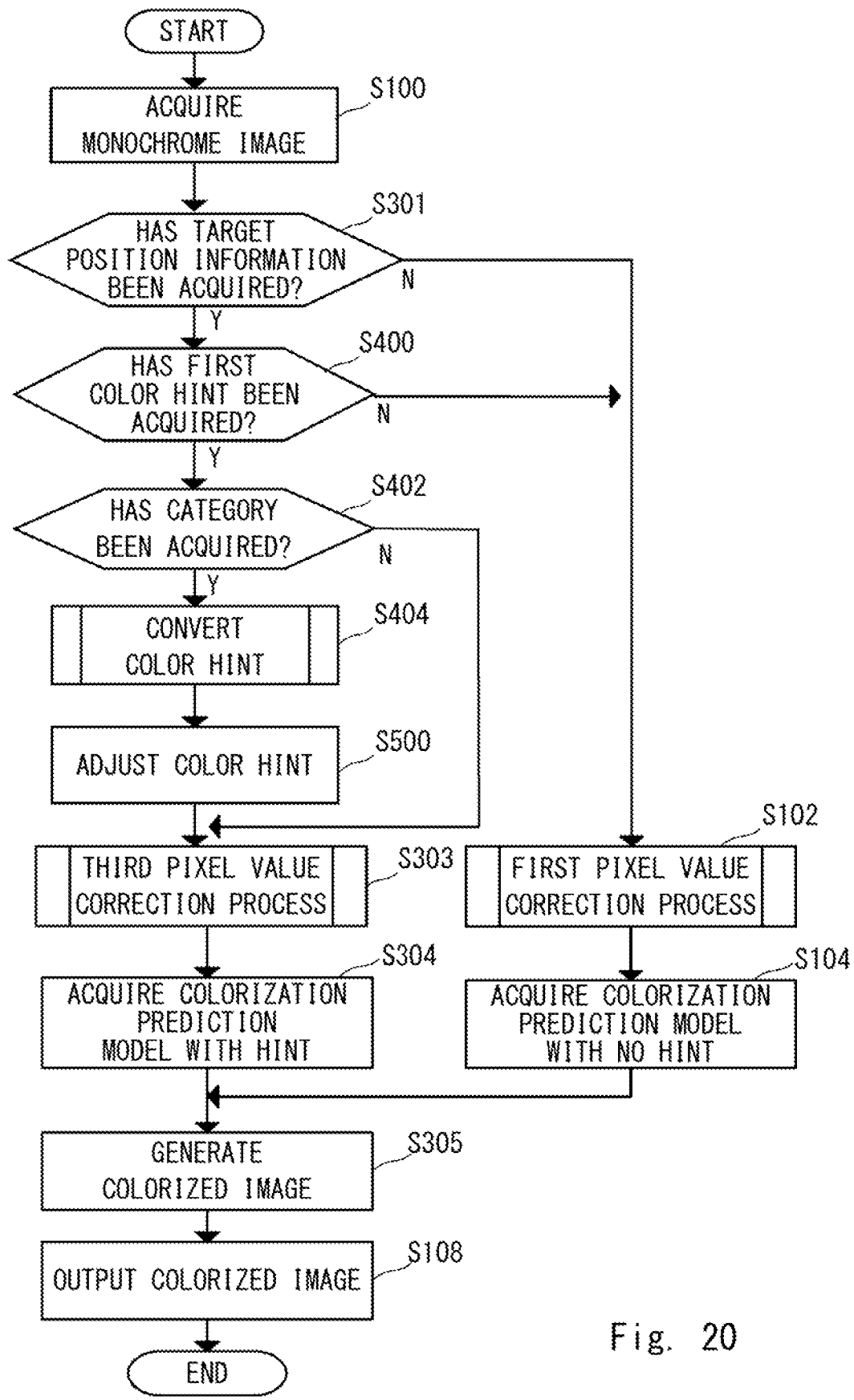
FIG. 20 is a flowchart showing image processing performed by the apparatus according to the fifth example embodiment.

FIG. 20 is a flowchart showing image processing performed by the apparatus 60 according to the fifth example embodiment. Steps shown in FIG. 20 include S500 in addition to Steps shown in FIG. 15 according to the fourth example embodiment. Note that Steps similar to those shown in FIG. 15 are denoted by the same reference symbols and the descriptions thereof will be omitted.

In S500, the hint adjustment unit 607 of the hint determination unit 604 performs a color hint adjustment process in response to the output of the second color hint from the hint conversion unit 506 in S404. Then the hint adjustment unit 607 outputs the second color hint to the pixel value correction unit 420 and the colorization generation unit 430, and advances the process to S303.

Figure 21:
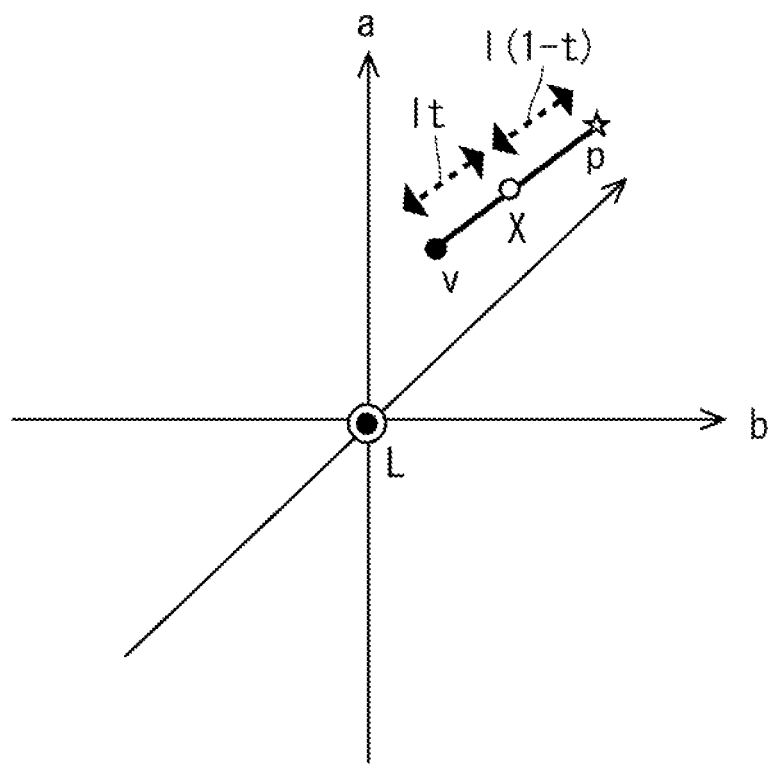
FIG. 21 is a conceptual diagram for explaining a color hint adjustment process according to the fifth example embodiment.

FIG. 21 is a conceptual diagram for explaining the color hint adjustment process (i.e., the process of S500 in FIG. 20) according to the fifth example embodiment. A point v shown in FIG. 21 is the color space coordinate of the first color hint acquired by the hint acquisition unit 505 (i.e., designated by a user) in S400. Further, a point p is the color space coordinate of the second color hint (i.e., the "preferred color") converted by the hint conversion unit 506 in S404. Further, a point X is the color space coordinate of the second color hint adjusted by the hint adjustment unit 607 in S500.

The hint adjustment unit 607 adjusts the color of the converted second color hint by setting the point X on a straight line connecting the point p to the point v. As a result of doing so, the hint adjustment unit 607 can perform processing to make the second color hint close in color to the "preferred color" by a predetermined degree relative to the first color hint or make it differ in color from the "preferred color" by a predetermined degree relative to the first color hint.

For example, FIG. 21 shows an example of a case in which the hint adjustment unit 607 sets the point X between the points v and p in the color space, that is, a case in which the second color hint is made close to the "preferred color" by a predetermined degree. For example, the distance between the points v and p is defined as 1, and the color space coordinates of the points v, p, and X are defined as v, p, and X, respectively, using a position vector. Further, a parameter indicating how close a color is made to the "preferred color" is defined as $t(-1 \leq t \leq 1)$. In FIG. 21, $t>0$ holds, and $X=1 \cdot t \cdot v + 1 \cdot (1-t) \cdot p$ is obtained.

Further, when $t<0$ holds, the hint adjustment unit 607 can also set the point X at a position opposite to the point p with respect to the point v on a straight line connecting the point v to the point p in the color space. That is, the hint adjustment unit 607 can make the second color hint differ in color from the "preferred color" by a predetermined degree.

As described above, according to the fifth example embodiment, the apparatus 60 can adjust the color hint H with preferences of a user based on the predetermined "preferred color" and perform the pixel value correction process and the colorization generation process based on the adjusted color hint H.

Sixth Example Embodiment

Next, a sixth example embodiment of the present disclosure will be described with reference to FIGS. 22 to 24. The sixth example embodiment is characterized in that the target position information P of the monochrome image M is automatically acquired.

Figure 22:
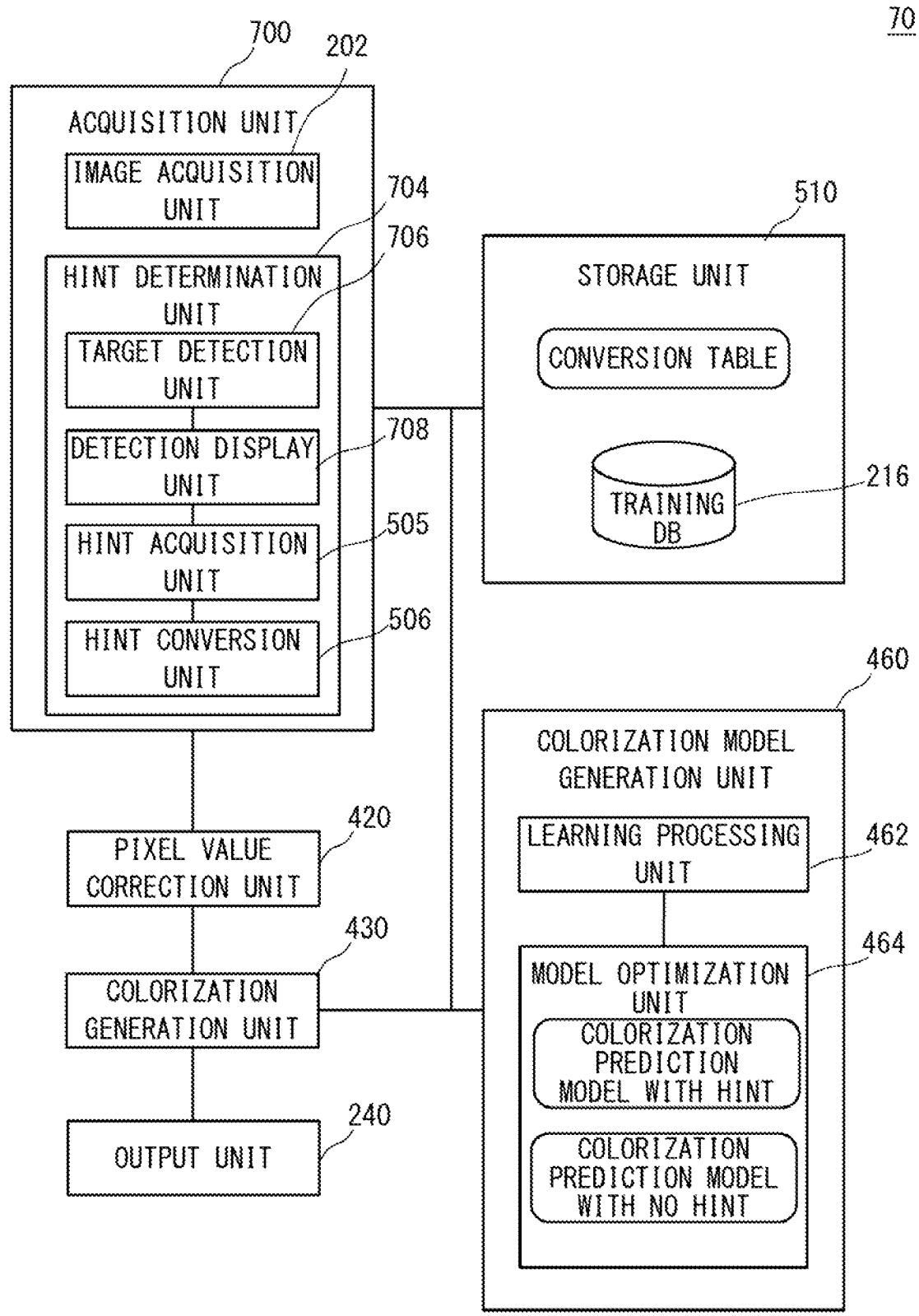
FIG. 22 is a schematic diagram of an apparatus according to a sixth example embodiment.

FIG. 22 is a schematic diagram of an apparatus 70 according to the sixth example embodiment. The configurations and the functions of the apparatus 70 are substantially similar to those of the apparatus 50 according to the fourth example embodiment. However, the apparatus 70 includes an acquisition unit 700 in place of the acquisition unit 500.

The configurations and the functions of the acquisition unit 700 are substantially similar to those of the acquisition unit 500, except that the acquisition unit 700 includes a hint determination unit 704 in place of the hint determination unit 504.

The hint determination unit 704 has the configuration of the hint determination unit 504 and includes a target detection unit 706 and a detection display unit 708.

The target detection unit 706 automatically detects the target part from the monochrome image M0 and acquires the target position information P. For example, the target detection unit 706 may detect a subject, and then detect pixel regions of the subject which it is estimated are similar in color to each other as the target part. Note that the target detection unit 706 may detect pixel regions which it is estimated are similar in color to each other based on differences between pixel values of the pixels included in the subject and positions of the pixels.

Then the target detection unit 706 estimates the category of the target part based on the detected target part. The target detection unit 706 outputs the estimated category to the hint conversion unit 506.

The detection display unit 708 selects the detected the target part and displays it. Therefore, a user can designate the first color hint without having to designate the target position information P of the target part. Note that the detection display unit 708 may display the detected subject in addition to the target part.

Note that the hint acquisition unit 505 may accept the input of the first color hint corresponding to the displayed target part from a user.

According to the sixth example embodiment, since the target detection unit 706 automatically detects the target position information P, an operation of designating the target position information P performed by a user is omitted, whereby a user's convenience is improved. Further, since the target detection unit 706 estimates the category of the target part when the target position information P is automatically detected, it is possible to automatically acquire the category of the target part. Thus, an operation of designating the category performed by a user is omitted, whereby a user's convenience is further improved.

Next, image processing performed by the apparatus 70 according to the sixth example embodiment will be described with reference to FIGS. 23 and 24. FIG. 23 is a flowchart showing the image processing performed by the apparatus 70 according to the sixth example embodiment. Further, FIG. 24 is a diagram showing an example of a user interface of the apparatus 70 according to the sixth example embodiment.

Figure 23:
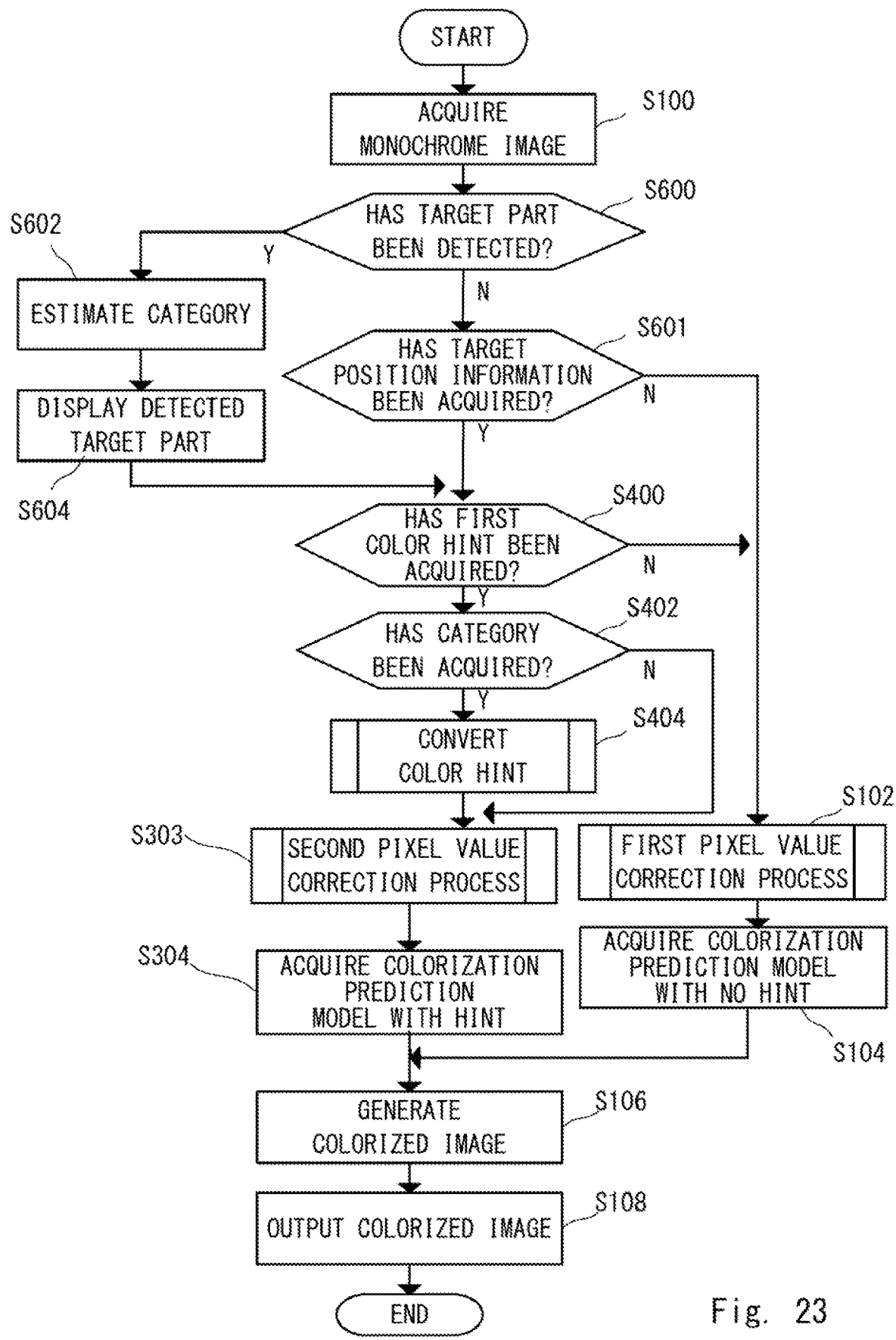
FIG. 23 is a flowchart showing image processing performed by the apparatus according to the sixth example embodiment.

Instead of Step S301 shown in FIG. 15 according to the fourth example embodiment, Steps shown in FIG. 23 include Steps S600 to S604. Note that Steps similar to those shown in FIG. 15 are denoted by the same reference symbols and the descriptions thereof will be omitted.

In S600, when the image acquisition unit 202 has acquired in S100 the monochrome image M0 to be colorized, the target detection unit 706 automatically detects the subject and the target part of the subject from the monochrome image M0, thereby determining whether or not it has acquired the target position information P.

If the target detection unit 706 determines that it has acquired the target position information P (Y in S600), it advances the process to S602, while if the target detection unit 706 determines that it has not acquired the target position information P (N in S600), it advances the process to S601.

In S601, the hint acquisition unit 505 performs a process similar to that performed in S301 of FIG. 15; that is, if the hint acquisition unit 505 has acquired the target position information P (Y in S601), it advances the process to S400, while if the hint acquisition unit 505 has not acquired the target position information P (N in S601), it advances the process to S102.

In S602, the target detection unit 706 estimates the category of the detected target part in response to the acquisition of the target position information P in S600. Then, as shown in FIG. 24, the estimated category is displayed on the category input unit 4.

Note that Steps S600 and S602 may be performed in parallel. Note that the target detection unit 706 may detect the subject and the target part using a predetermined object recognition model trained by machine learning, acquire the target position information P, and then estimate the category of the target part. The predetermined object recognition model may include a neural network, in particular, a CNN, which detects objects from an image and recognizes them.

Further, when the subject is a person or the like, the target detection unit 706 may detect the subject by using the predetermined object recognition model and estimate the positions of the face, the arms, the legs, and the like of the person or the like by using, for example, a skeleton estimation technique. Then the target detection unit 706 may use these estimated positions as the target position information P of the target part, and estimate that the category of the target part is "the skin of a person". Thus, even when the target parts of the same categories are present in a state in which they are separated from each other, it is possible to prevent a user from designating the first hint a plurality of times in S400 subsequent to S601, whereby a user's convenience is improved.

Note that, in the sixth example embodiment, the target detection unit 706 recognizes the target part from the monochrome image M0 by using a rectangular frame, and thus acquires the target position information P and the category. However, the target detection unit 706 may instead acquire the target position information P by estimating which category each region of the monochrome image M0 belongs to using Semantic Segmentation.

In S604, the detection display unit 708 displays a detected subject F and pixels corresponding to the target position information P of the target part on the monochrome image display unit 1. For example, as shown in FIG. 24, the monochrome image display unit 1 may superimpose a rectangular frame indicating the detected subject F and the pixels corresponding to the target position information P on the acquired monochrome image M0 and display it.

Note that when the target detection unit 706 uses Semantic Segmentation, the detection display unit 708 may superimpose a frame or the like surrounding the outline of the detected region on the monochrome image M as the detected subject F and display it. Then the detection display unit 708 advances the process to S400.

Note that when the monochrome image M0 includes a plurality of detected target parts, the detection display unit 708 may sequentially display the detected target parts and request the hint acquisition unit 505 to prompt a user to input the first color hint.

Figure 24:
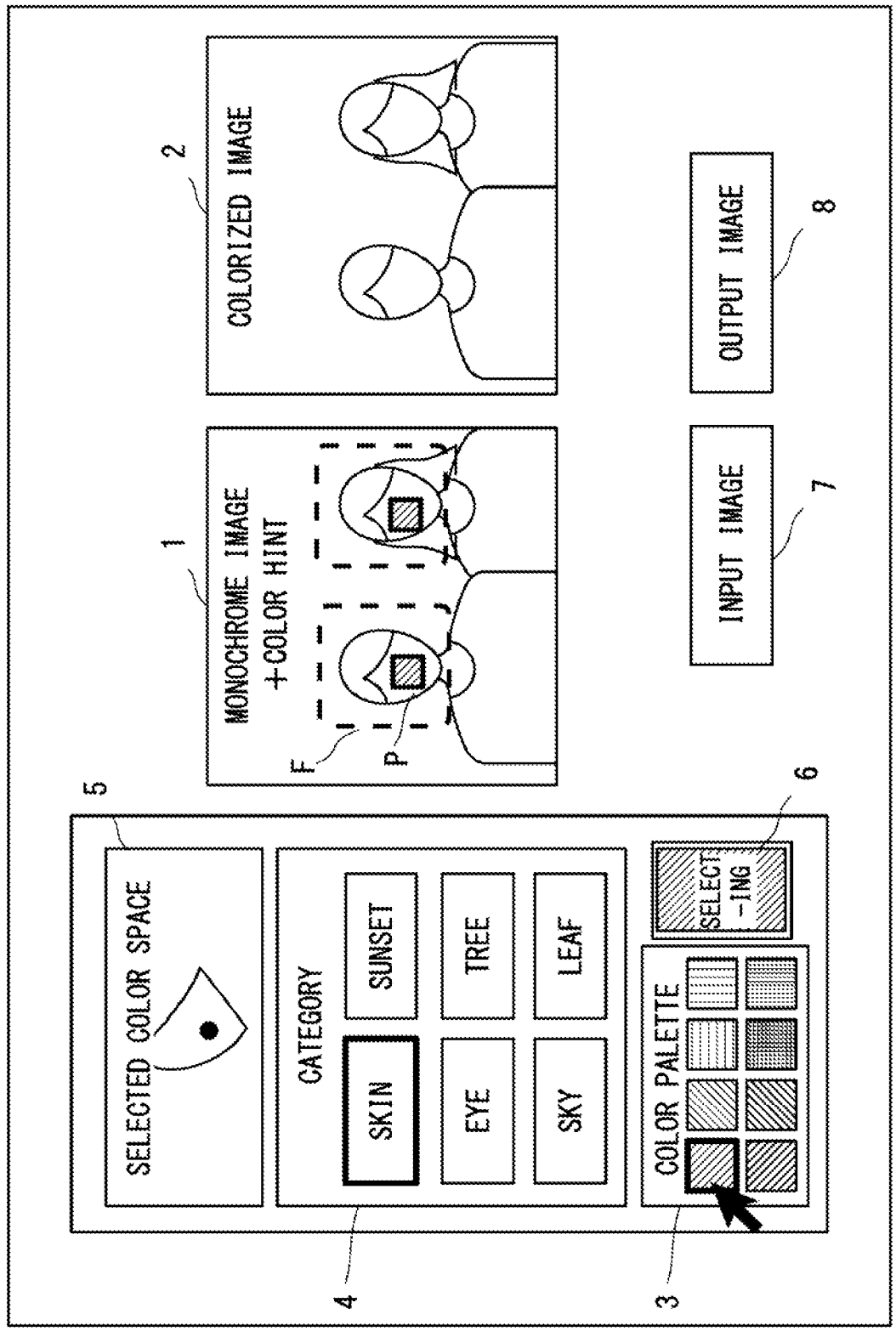
FIG. 24 is a diagram showing an example of a user interface of the apparatus according to the sixth example embodiment.

Further, as shown in FIG. 24, when the monochrome image M0 includes a plurality of target parts of the same category, the detection display unit 708 may select the plurality of target parts at a time and display them on the monochrome image display unit 1. By doing so, it is possible to prevent a user from designating the first color hint a plurality of times in S400 subsequent to S604, whereby a user's convenience is improved.

In the above-described example embodiments, a computer is composed of a computer system including a personal computer, a word processor, etc. However, the computer is not limited thereto and may be composed of a Local Area Network (LAN) server, a host of computer (personal computer) communications, a computer system connected on the Internet, etc. Further, functions may be distributed over respective devices on the network and the entire network may compose the computer.

Note that, although the present disclosure has been described as a hardware configuration in the above example embodiments, the present disclosure is not limited thereto. In the present disclosure, any function (process), in particular, the processes shown in FIGS. 1, 4, 5, 7, 8, 11, 12, 15 to 18, 20, and 23 may be implemented by causing a Central Processing Unit (CPU) to execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Processes performed by the apparatus and the method shown in the claims, the specification, and the figures can be performed in any order as long as the order of a process is not indicated by "prior to," "before," or the like and as long as the output from a previous process is not used in a later process. Even if the process flows in the claims, the specification, and the figures are described using phrases such as "first" or "next" for the sake of convenience, it does not necessarily mean that the processes have to be performed in this order.

Although the present disclosure has been described with reference to the example embodiments, the present disclosure is not limited to the above-described example embodiments. Various changes that may be understood by those skilled in the art may be made to the configurations and details of the present disclosure within the scope of the disclosure.

The whole or part of the exemplary embodiments disclosed above can be described as, but not limited to, the following supplementary notes.

(Supplementary Note 1)

An image processing system comprising:

an image acquisition unit configured to acquire a monochrome image;

a pixel value correction unit configured to correct a pixel value of the monochrome image based on information related to a pixel value; and a colorization generation unit configured to generate a colorized image corresponding to the monochrome image from the corrected monochrome image by using a colorization prediction model trained by machine learning.

(Supplementary Note 2)

The image processing system according to Supplementary note 1, wherein the information related to the pixel value includes a color hint indicating a color of a target part included in the monochrome image, and the pixel value correction unit corrects the pixel value of the monochrome image based on the color hint.

(Supplementary Note 3)

The image processing system according to Supplementary note 2, wherein the color hint is associated with one or a plurality of pixels of the target part included in the monochrome image, and the pixel value correction unit determines an amount of correction of the pixel value of the pixel included in the monochrome image based on the pixel value(s) of the one or the plurality of pixels of the monochrome image and the pixel value corresponding to the color hint.

(Supplementary Note 4)

The image processing system according to Supplementary note 2 or 3, wherein the colorization generation unit generates the colorized image corresponding to the monochrome image from the corrected monochrome image and the color hint by using the colorization prediction model.

(Supplementary Note 5)

The image processing system according to any one of Supplementary notes 2 to 4, wherein the color hint includes a first color hint and a second color hint, the image processing system further comprises:

a hint acquisition unit configured to acquire a category of the target part and the first color hint; and a hint conversion unit configured to convert the first color hint into the second color hint based on the acquired category, and the pixel value correction unit corrects the pixel value of the monochrome image based on the second color hint.

(Supplementary Note 6)

The image processing system according to Supplementary note 1, wherein the information related to the pixel value includes a parameter of a correction model for correcting the pixel value of the monochrome image so that a distribution of the pixel values of the monochrome image approaches a reference distribution, and the pixel value correction unit corrects the pixel value of the monochrome image by using the correction model.

(Supplementary Note 7)

The image processing system according to Supplementary note 1, wherein the information related to the pixel value includes a parameter of the correction model for correcting a luminance value of the monochrome image, and the image processing system comprises a correction parameter optimization unit configured to optimize the parameter of the correction model by using a luminance prediction model that is trained by using a luminance of a color image for learning and a luminance of a monochrome image corresponding to the color image for learning as training data, and the pixel value correction unit corrects the luminance value of the monochrome image by using the correction model.

(Supplementary Note 8)

An image processing method comprising:

acquiring a monochrome image;

correcting a pixel value of the monochrome image based on information related to a pixel value; and generating a colorized image corresponding to the monochrome image from the corrected monochrome image by using a colorization prediction model trained by machine learning.

(Supplementary Note 9)

A non-transitory computer readable medium storing an image processing program for causing a computer to implement:

an image acquisition function of acquiring a monochrome image;

a pixel value correction function of correcting a pixel value of the monochrome image based on information related to a pixel value; and a colorization generation function of generating a colorized image corresponding to the monochrome image from the corrected monochrome image by using a colorization prediction model trained by machine learning.

REFERENCE SIGNS LIST

1 MONOCHROME IMAGE DISPLAY UNIT
2 COLORIZED IMAGE DISPLAY UNIT
3 COLOR PALETTE
4 CATEGORY INPUT UNIT
5 COLOR SPACE DISPLAY UNIT
6 HINT DISPLAY UNIT
7 IMAGE INPUT UNIT
8 IMAGE OUTPUT UNIT
10, 20, 30, 40, 50, 60, 70 APPARATUS
102 IMAGE ACQUISITION UNIT
120, 220, 320, 420 PIXEL VALUE CORRECTION UNIT
130, 230, 430 COLORIZATION GENERATION UNIT
200, 400, 500, 600, 700 ACQUISITION UNIT
202 IMAGE ACQUISITION UNIT
210, 310, 510 STORAGE UNIT
216, 316 TRAINING DATABASE
240 OUTPUT UNIT
260, 460 COLORIZATION MODEL GENERATION UNIT
262, 462 LEARNING PROCESSING UNIT
264, 464 MODEL OPTIMIZATION UNIT
350 CORRECTION PARAMETER OPTIMIZATION UNIT
352 LEARNING PROCESSING UNIT
354 MODEL OPTIMIZATION UNIT
404, 504, 604, 704 HINT DETERMINATION UNIT
405, 505 HINT ACQUISITION UNIT
506 HINT CONVERSION UNIT
607 HINT ADJUSTMENT UNIT
706 TARGET DETECTION UNIT
708 DETECTION DISPLAY UNIT
M, M0, M1 MONOCHROME IMAGE
C COLORIZED IMAGE
H COLOR HINT
P TARGET POSITION INFORMATION
F DETECTED SUBJECT

What is claimed is:

1. An image processing system comprising:
at least one memory storing instructions; and
at least one processor configured to execute the instructions to:
acquire a monochrome image;
decompose a plurality of pixels in the monochrome image into superpixels based on pixel values and pixel positions of the plurality of pixels;
cluster the superpixels based on a representative pixel value and a representative pixel position of the superpixels to generate a cluster;
determine an amount of correction of a pixel value of a pixel of the monochrome image based on a representative value of the pixel values of the cluster including one or more pixels associated with a color hint indicating a color of a target part in the monochrome image and a hint pixel value corresponding to the color hint;

correct the pixel value of the pixel of the monochrome image based on information related to the pixel value to generate a corrected monochrome image, the information related to the pixel value comprising the color hint; and generate a colorized image corresponding to the monochrome image from the corrected monochrome image by using a colorization prediction model trained by machine learning.

2. The image processing system according to claim 1, wherein the at least one processor is further configured to execute the instructions to generate the colorized image corresponding to the monochrome image from the corrected monochrome image and the color hint by using the colorization prediction model.

3. The image processing system according to claim 1, wherein the color hint includes a first color hint and a second color hint, and wherein the at least one processor is further configured to execute the instructions to:
acquire a category of the target part and the first color hint;
convert the first color hint into the second color hint based on the category; and
correct the pixel value of the monochrome image based on the second color hint.

4. The image processing system according to claim 1, wherein the information related to the pixel value includes a parameter of a correction model for correcting the pixel value of the monochrome image so that a distribution of pixel values of the monochrome image approaches a reference distribution, and wherein the at least one processor is further configured to execute the instructions to correct the pixel value of the monochrome image by using the correction model.

5. The image processing system according to claim 1, wherein the information related to the pixel value includes a parameter of a correction model for correcting a luminance value of the monochrome image, and wherein the at least one processor is configured to execute the instructions to:
optimize the parameter of the correction model by using a luminance prediction model that is trained by using a luminance of a training color image for learning and a luminance of a training monochrome image corresponding to the training color image for learning as training data; and correct the luminance value of the monochrome image by using the correction model.

6. An image processing method comprising:
acquiring a monochrome image;
decomposing a plurality of pixels in the monochrome image into superpixels based on pixel values and pixel positions of the plurality of pixels;
clustering the superpixels based on a representative pixel value and a representative pixel position of the superpixels to generate a cluster;
determining an amount of correction of a pixel value of a pixel of the monochrome image based on a representative value of the pixel values of the cluster including one or more pixels associated with a color hint indicating a color of a target part in the monochrome image and a hint pixel value corresponding to the color hint;
correcting the pixel value of the pixel of the monochrome image based on information related to the pixel value to generate a corrected monochrome image, the information related to the pixel value comprising the color hint; and
generating a colorized image corresponding to the monochrome image from the corrected monochrome image by using a colorization prediction model trained by machine learning.

7. A non-transitory computer readable medium storing an image processing program for causing a computer to:
acquire a monochrome image;
decompose a plurality of pixels in the monochrome image into superpixels based on pixel values and pixel positions of the plurality of pixels;
cluster the superpixels based on a representative pixel value and a representative pixel position of the superpixels to generate a cluster;
determine an amount of correction of a pixel value of a pixel of the monochrome image based on a representative value of the pixel values of the cluster including one or more pixels associated with a color hint indicating a color of a target part in the monochrome image and a hint pixel value corresponding to the color hint;
correct the pixel value of the pixel of the monochrome image based on information related to the pixel value to generate a corrected monochrome image, the information related to the pixel value comprising the color hint; and
generate a colorized image corresponding to the monochrome image from the corrected monochrome image by using a colorization prediction model trained by machine learning.

* * * * *